US012665190B2

(12) United States Patent
Lee et al.

(10) Patent No.: US 12,665,190 B2
(45) Date of Patent: Jun. 23, 2026

(54) ALL-SOLID SECONDARY BATTERY AND METHOD OF PREPARING ALL-SOLID SECONDARY BATTERY

(71) Applicants: Samsung Electronics Co., Ltd., Suwon-si (KR); CORNING INCORPORATED, Corning, NY (US)

(72) Inventors: Myungjin Lee, Suwon-si (KR); Jusik Kim, Suwon-si (KR); Ryounghee Kim, Suwon-si (KR); Sewon Kim, Suwon-si (KR); Michael Edward Badding, Campbell, NY (US); Wonseok Chang, Suwon-si (KR); JaeMyung Chang, Ansan-si (KR); Zhen Song, Painted Post, NY (US); Sung Heo, Suwon-si (KR)

(73) Assignees: SAMSUNG ELECTRONICS CO., LTD., Gyeonggi-Do (KR); CORNING INCORPORATED, Corning, NY (US)

( * ) Notice: Subject to any disclaimer, the term of this patent is extended or adjusted under 35 U.S.C. 154(b) by 554 days.

(21) Appl. No.: 18/297,507

(22) Filed: Apr. 7, 2023

(65) Prior Publication Data

US 2023/0246177 A1 Aug. 3, 2023

Related U.S. Application Data

(60) Provisional application No. 63/347,148, filed on May 31, 2022.

(30) Foreign Application Priority Data

Jul. 8, 2022 (KR) ........................ 10-2022-0084617
Feb. 20, 2023 (KR) ........................ 10-2023-0022420

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/133* (2013.01); *H01M 4/485* (2013.01);
(Continued)

(58) Field of Classification Search
CPC ........... H01M 10/052; H01M 10/0525; H01M 10/0562; H01M 10/058; H01M 2004/027;
(Continued)

(56) References Cited

U.S. PATENT DOCUMENTS 6,402,795 B1 6/2002 Chu et al.
6,485,622 B1 11/2002 Fu
(Continued)

FOREIGN PATENT DOCUMENTS

EP 4109619 A1 12/2022
EP 4362140 A1 5/2024
(Continued)

OTHER PUBLICATIONS

Extended European Search Report issued Oct. 27, 2023 of EP Patent Application No. 23164708.2.
(Continued)

*Primary Examiner* — Victoria H Lynch
(74) *Attorney, Agent, or Firm* — CANTOR COLBURN LLP

(57) ABSTRACT

An all-solid secondary battery including: a positive electrode layer including a positive active material; a negative electrode layer including a negative electrode current collector and a first negative active material layer; and a solid electrolyte layer between the positive electrode layer and the negative electrode layer, the solid electrolyte including a solid electrolyte, wherein the first negative active material layer is adjacent to the solid electrolyte layer, the first negative active material layer includes a multi-component
(Continued)

metal composite including M1, M2, M3, and X, an atomic ratio of M2M3X to M1M2M3X in the multi-component metal composite is in a range of about 0.5 to about 0.85, and an atomic ratio of M2M3X to M1 ion is in a range of about 1 to about 5.51.

20 Claims, 7 Drawing Sheets

(51) Int. Cl.

| | |
|---|---|
| *H01M 4/133* | (2010.01) |
| *H01M 4/485* | (2010.01) |
| *H01M 4/587* | (2010.01) |
| *H01M 10/0562* | (2010.01) |
| *H01M 10/058* | (2010.01) |
| *H01M 4/02* | (2006.01) |

(52) U.S. Cl.
CPC ....... *H01M 4/587* (2013.01); *H01M 10/0562* (2013.01); *H01M 10/058* (2013.01); *H01M 2004/027* (2013.01); *H01M 2300/0071* (2013.01)

(58) Field of Classification Search
CPC ......... H01M 2300/0071; H01M 4/131; H01M 4/133; H01M 4/364; H01M 4/366; H01M 4/485; H01M 4/587; Y02E 60/10
See application file for complete search history.

(56) References Cited

U.S. PATENT DOCUMENTS

| | | | |
|---|---|---|---|
| 7,273,682 | B2 | 9/2007 | Park et al. |
| 7,901,658 | B2 | 3/2011 | Weppner et al. |
| 7,914,932 | B2 | 3/2011 | Yoshida et al. |
| 8,828,580 | B2 | 9/2014 | Msco et al. |
| 8,865,355 | B2 | 10/2014 | Iriyama et al. |
| 9,034,524 | B2 | 5/2015 | Moon et al. |
| 9,531,036 | B2 | 12/2016 | Ohta et al. |
| 9,559,396 | B2 | 1/2017 | Lee et al. |
| 9,761,905 | B2 | 9/2017 | Eisele et al. |
| 9,859,559 | B2 | 1/2018 | Kim et al. |
| 10,033,066 | B2 | 7/2018 | Nemori et al. |
| 10,109,851 | B2 | 10/2018 | Song et al. |
| 10,128,533 | B2 | 11/2018 | Yamamoto et al. |
| 10,135,084 | B2 | 11/2018 | Lee et al. |
| 10,168,389 | B2 | 1/2019 | Fujiki et al. |
| 11,158,880 | B2 | 10/2021 | Chao et al. |
| 2016/0043392 | A1 | 2/2016 | Fujiki et al. |
| 2016/0164138 | A1 | 6/2016 | Han et al. |
| 2017/0025705 | A1 | 1/2017 | Miara et al. |
| 2017/0141380 | A1* | 5/2017 | Aoki ................. H01M 10/0525 |
| 2017/0373304 | A1 | 12/2017 | Kim et al. |
| 2018/0006326 | A1 | 1/2018 | O'Neill et al. |
| 2018/0123167 | A1 | 5/2018 | Yi et al. |
| 2018/0205112 | A1 | 7/2018 | Thomas-Alyea et al. |
| 2018/0226633 | A1 | 8/2018 | Fujiki et al. |
| 2018/0301754 | A1 | 10/2018 | Badding et al. |
| 2019/0044186 | A1 | 2/2019 | Kim et al. |
| 2019/0088993 | A1 | 3/2019 | Ohta |
| 2019/0157723 | A1 | 5/2019 | Suzuki et al. |
| 2019/0207252 | A1 | 7/2019 | Badding et al. |
| 2019/0393505 | A1 | 12/2019 | Suzuki et al. |
| 2020/0083562 | A1 | 3/2020 | Kim et al. |
| 2020/0106130 | A1 | 4/2020 | Takano et al. |
| 2020/0106131 | A1 | 4/2020 | Takano et al. |
| 2020/0243899 | A1* | 7/2020 | Arthur ................. H01M 4/382 |
| 2020/0270143 | A1 | 8/2020 | Ohta et al. |
| 2020/0313164 | A1 | 10/2020 | Suzuki et al. |
| 2020/0328459 | A1 | 10/2020 | Sakai et al. |
| 2020/0328465 | A1 | 10/2020 | Sakaida et al. |
| 2020/0343533 | A1 | 10/2020 | Herle |
| 2021/0043966 | A1 | 2/2021 | Gwon et al. |
| 2021/0119203 | A1 | 4/2021 | Kim et al. |
| 2021/0226249 | A1 | 7/2021 | Ogata et al. |
| 2021/0242492 | A1 | 8/2021 | Yamamoto et al. |
| 2021/0257606 | A1 | 8/2021 | Kim et al. |
| 2021/0280853 | A1 | 9/2021 | Kim et al. |
| 2021/0296627 | A1 | 9/2021 | Holme et al. |
| 2021/0376378 | A1 | 12/2021 | Jung et al. |
| 2022/0416235 | A1 | 12/2022 | Kim et al. |
| 2024/0258533 | A1 | 8/2024 | Lee et al. |

FOREIGN PATENT DOCUMENTS

| | | | |
|---|---|---|---|
| KR | 20160017592 A | 2/2016 |
| KR | 20170120981 A | 11/2017 |
| KR | 101805050 B1 | 12/2017 |
| KR | 20180001973 A | 1/2018 |
| KR | 20200028165 A | 3/2020 |
| KR | 20210149619 A | 12/2021 |
| KR | 102349962 B1 | 1/2022 |
| KR | 20230001509 A | 1/2023 |
| WO | 2019135319 A1 | 7/2019 |
| WO | 2020072524 A1 | 4/2020 |
| WO | 2020176905 A1 | 9/2020 |

OTHER PUBLICATIONS

Hoi Jin Yoon et al., "Effect of Annealing Temperature on Phase-change Characteristics of GeSbTe-based Bilayers," J. Korean Inst. Electr. Electron. Mater. Eng., Feb. 2017, pp. 86-90 , vol. 30, No. 2.
Office Action issued Aug. 28, 2025, in corresponding EP Patent Application No. 23164708.2, 6 pp.

* cited by examiner

ALL-SOLID SECONDARY BATTERY AND METHOD OF PREPARING ALL-SOLID SECONDARY BATTERY

CROSS-REFERENCE TO RELATED APPLICATIONS

This application is based on and claims priority to U.S. Provisional Application No. 63/347,148, filed on May 31, 2022, in the U.S. Patent and Trademark Office, and Korean Patent Application Nos. 10-2022-0084617, filed on Jul. 8, 2022, and 10-2023-0022420 filed on Feb. 20, 2023 in the Korean Intellectual Property Office, and all the benefits accruing therefrom under 35 U.S.C. § 119, the contents of both which are incorporated herein in their entirety by reference.

BACKGROUND

1. Field

The disclosure relates to an all-solid secondary battery and a method of preparing the all-solid secondary battery.

2. Description of the Related Art

Recently, batteries having high energy density and excellent safety have actively been developed due to industrial demand. For example, lithium-ion batteries have been put into practical use not only in the fields of information-related devices and communication devices, but also in the automotive field. In the automotive field, safety is especially important because it relates to life.

Lithium-ion batteries currently available on the market use an electrolytic solution containing a flammable organic solvent, and thus, when a short circuit occurs, there is a possibility of overheating and the occurrence of fires. Accordingly, all-solid secondary batteries using solid electrolytes have been proposed instead of electrolytic solutions.

Since all-solid secondary batteries do not use a flammable organic solvent, even if a short circuit occurs, the possibility of causing a fire or an explosion may be greatly reduced. Therefore, such all-solid secondary batteries may greatly improve safety, as compared with lithium-ion batteries using an electrolytic solution.

In all-solid secondary batteries of the related art, as the electrolyte is solid, lithium locally precipitates at an interface between a solid electrolyte layer and a negative electrode layer, and the lithium grows and, as a result, penetrates the solid electrolyte layer, resulting in a short circuit of the battery. In addition, as the solid electrolyte layer and the negative electrode layer are simply stacked, the effective interface area between the solid electrolyte layer and the negative electrode layer becomes less than the actual contact area. Therefore, due to the increase in interfacial resistance at the interface between the solid electrolyte layer and the negative electrode layer, the internal resistance of the battery increases, and as a result, cycle characteristics of the battery may deteriorate.

SUMMARY

Provided is an all-solid secondary battery having improved cycle characteristics, wherein short circuit is prevented during charge and discharge.

Provided is a method of preparing the all-solid secondary battery.

Additional aspects will be set forth in part in the description which follows and, in part, will be apparent from the description, or may be learned by practice of the presented embodiments of the disclosure.

According to an aspect of the disclosure, all-solid secondary battery may include a positive electrode layer including a positive active material, a negative electrode layer including a negative electrode current collector and a first negative active material layer, and a solid electrolyte layer between the positive electrode layer and the negative electrode layer, and the solid electrolyte layer including a solid electrolyte, wherein the first negative active material layer is adjacent to the solid electrolyte layer, the first negative active material layer includes a multi-component metal composite including M1, M2, M3, and X, an atomic ratio of M2M3X to M1M2M3X in the multi-component metal composite is in a range of about 0.5 to about 0.85, an atomic ratio of M2M3X to M1 ion is in a range of about 1 to about 5.51, M1 is a Group 1 element, Group 2 element, or a combination thereof, M2 is Sc, V, Cr, Mn, Fe, Co, Ni, Cu, Zn, Ga, Al, Ge, Y, Zr, Hf, Nb, Tc, Rh, Cd, In, B, Si, P, F, Cl, Br, I, S, As, Re, Hg, Tl, Pb, Bi, Au, Ag, Pd, Mo, Sn, Nb, Sr, Mo, Pd, or a combination thereof, and optionally C, N, or a combination thereof, M3 is selected differently from M2, and is Ti, Nb, Sb, Bi, Ta, Mo, Ru, Pd, Ag, Sn, Se, Te, W, Os, Ir, Pt, Au, or a combination thereof, and X is O, N, P, or a combination thereof.

According to another aspect of the disclosure, a method of preparing the all-solid secondary battery is provided, the method including providing a solid electrolyte layer, disposing a pre-first negative active material layer on a first surface of the solid electrolyte layer, heat treating the pre-first negative active material layer at a temperature of less than 600° C. to prepare a first negative active material layer, disposing a negative electrode current collector on the first negative active material layer, and disposing a positive active material layer on a second surface of the solid electrolyte layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
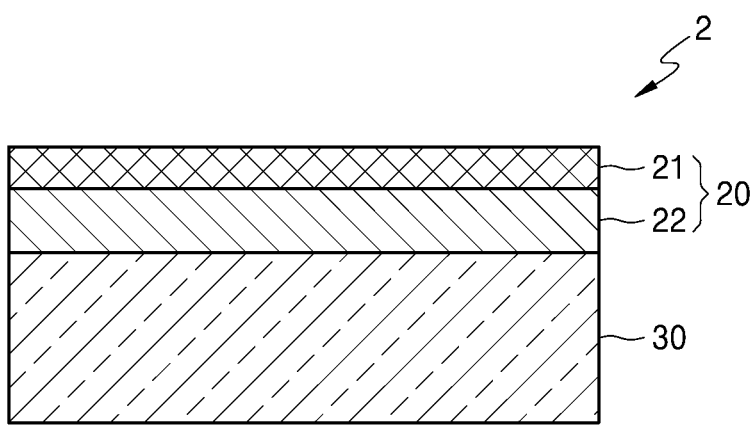
FIG. 1A is a cross-sectional view of an embodiment of a negative electrode structure for an all-solid secondary battery.

Reference will now be made in detail to embodiments, examples of which are illustrated in the accompanying drawings, wherein like reference numerals refer to like elements throughout the specification. In this regard, the present embodiments may have different forms and should not be construed as being limited to the descriptions set forth herein. Accordingly, the embodiments are merely described below, by referring to the figures, to explain various aspects. These embodiments are provided so that this disclosure will be thorough and complete, and will fully convey the scope of the invention to those skilled in the art. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Endpoints of ranges may each be independently selected.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an all-solid secondary battery and a method of preparing the all-solid secondary battery will be described in further detail.

An all-solid secondary battery using lithium alloy as a negative electrode layer may have a low lithium ion diffusion coefficient, as compared with a battery using a negative electrode layer comprising a carbonaceous negative active material. Because lithium transfer does not occur quickly, the kinetic performance of the all-solid secondary battery may be deteriorated.

In addition, the negative electrode layer of an all-solid secondary battery comprising a carbonaceous negative active material may not have excellent bonding strength with a solid electrolyte, and thus, the interfacial stability between the negative electrode layer and the solid electrolyte layer is not sufficient. When the negative electrode layer consists of only metal, current non-uniformity may occur due to particle aggregation during the alloying and dealloying process with lithium during charge and discharge, and an alloy phase with low lithium diffusion is formed. As a result, the high-rate characteristic of the all-solid secondary battery may be partially reduced. In addition, during charge and discharge at a high temperature, metal diffuses in the electrode, which may deteriorate lifespan characteristics of the all-solid secondary battery.

An all-solid secondary battery according to an embodiment is provided to solve the above-described problems. The all-solid-state secondary battery in which a first negative active material layer is formed adjacent to a solid electrolyte layer through thermal bonding of solid electrolyte of the solid electrolyte layer and metal of the negative electrode layer is provided. In the all-solid-state secondary battery, a short circuit is prevented through uniform lithium diffusion, and adhesion between the first negative active material layer and the solid electrolyte layer is increased. By forming the above-described first negative active material layer, adhesion between the solid electrolyte layer and the second negative active material layer placed in contact with the negative electrode current collector may be greatly improved. When the solid electrolyte layer is, for example, an oxide-based (i.e., oxide) solid electrolyte layer, adhesion between the first negative active material layer and the solid electrolyte layer may be greatly improved, and using the solid electrolyte layer, an all-solid secondary battery with improved high-rate characteristics may be manufactured.

Provided is an all-solid secondary battery including: a positive electrode layer including a positive active material; a negative electrode layer including a negative electrode current collector and a first negative active material layer, the first negative active material layer including a multi-component metal composite containing M1, M2, M3, and X; and a solid electrolyte layer between the positive electrode layer and the negative electrode layer and including a solid electrolyte, wherein the first negative active material layer is adjacent to the solid electrolyte layer, an atomic ratio (M2M3X/M1M2M3X) of M2M3X to M1M2M3X in the multi-component metal composite is in a range of about 0.5 to about 0.85, and an atomic ratio (M2M3X/M1) of M2M3X to M1 ion is in a range of about 1 to about 5. M1 is a Group 1 element, Group 2 element, or a combination thereof, M2 is Sc, V, Cr, Mn, Fe, Co, Ni, Cu, Zn, Ga, Al, Ge, Y, Zr, Hf, Nb, Tc, Rh, Cd, In, B, Si, P, F, Cl, Br, I, S, As, Re, Hg, Tl, Pb, and optionally C, N, or a combination thereof, M3 is Ti, Nb, Sb, Bi, Ta, Mo, Ru, Pd, Ag, Sn, Se, Te, W, Os, Ir, Pt, Au, or a combination thereof, and X is O, N, P, or a combination thereof.

M2 and M3 may each be a metal that may form an alloy or a compound with lithium, and Li may be one of M1.

The multi-component metal composite may be, for example, a compound represented by Formula 1:

$$(M1)_a(M2)_b(M3)_c(X)_d \qquad \text{Formula 1}$$

wherein, in Formula 1, M1 may be Li, Na, K, Rb, Cs, Mg, Ca, Sr, Ba, or a combination thereof, M2 is an element of Sc, V, Cr, Mn, Fe, Co, Ni, Cu, Zn, Ga, Al, Ge, Y, Zr, Hf, Nb, Tc, Rh, Cd, In, B, Si, P, F, Cl, Br, I, S, As, Re, Hg, Tl, Pb, Bi, Au, Ag, Pd, Mo, Sn, Nb, Sr, Mo, Pd, or a combination thereof, and optionally C, N, or a combination thereof, M3 is selected differently from M2, and M3 may be Ti, Nb, Sb, Bi, Ta, Mo, Ru, Pd, Ag, Sn, Se, Te, W, Os, Ir, Pt, Au, or a combination thereof, X may be O, N, P, or a combination thereof, and $0.1 \leq a \leq 1$, $0 < b \leq 3$, $0 < c \leq 2$, and $0.5 \leq d \leq 2$.

The first negative active material layer may be a compact layer not having pores. The first negative active material layer may be identified by a scanning electron microscope (SEM).

When the first negative active material layer has pores, lithium moves through the pores. However, as the first negative active material layer according to an embodiment may have a compact layer form, a uniform coating layer may be formed, and thus, adhesion between the first negative active material layer and the solid electrolyte layer may be further improved. Thus, lithium transfer may be facilitated, as compared with the first negative active material layer having pores.

A second negative active material may be a carbonaceous negative active material, and optionally a metal or a metalloid negative active material.

A reduction potential of a lithium ion of M2 may be different from a reduction potential of a lithium ion of M3. The reduction potential of the lithium ion of M2 may be greater or less than a reduction potential of the lithium ion of M3. A difference between the reduction potential of the lithium ion of M2 and the reduction potential of the lithium ion of M3 may be, for example, about 0.05 Volts (V) or greater, about 0.1 V or greater, about 0.2 V or greater, about 0.3 V or greater, about 0.4 V or greater, or about 0.5 V or greater, e.g., about 0.05 V or about 2 V, about 0.1 V to about 1.8 V, about 0.2 V to about 1.6 V, or about 0.3 V to about 1.4 V. In addition, when forming an alloy with Li, M2 and M3 have low fluidity such that an eutectic temperature may be about 300° C. or greater, for example, about 600° C. or greater, e.g., about 300° C. to about 900° C., or about 350° C. to about 800° C.

In an embodiment, in Formula 1, M1 may be Li, M2 may be Ge, Ga, Cu, or a combination thereof, M3 may be Te, Nb, Sb, Bi, Ta, Se, or a combination thereof, X may be O, N, P, or a combination thereof, and $0.1 \leq a \leq 1$, $0 < b \leq 3$, $0 < c \leq 2$, and $0.5 \leq d \leq 2$.

In an embodiment, M1 may be lithium, M2 may be germanium (Ge), M3 may be tellurium (Te), selenium (Se), or a combination thereof, and X may be oxygen.

In the multi-component metal composite, the compound of Formula 1, a ratio of each element may be analyzed by observing the composition thereof while sputtering over time through X-ray photoelectron spectroscopy (XPS) analysis. M2M3X/M1M2M3X may be in a range of about 0.5 to about 0.85, about 0.55 to about 0.84, about 0.55 to about 0.82, about 0.6 to about 0.8, or about 0.65 to about 0.77. When an atomic ratio of M2M3X/M1M2M3X is less than about 0.5, an X content may increase, and the resistance may increase. When the atomic ratio is greater than 0.85, lithium diffusion may decrease, and lithium mobility may decrease. When the atomic ratio is within any of these ranges, high lithium diffusion may be maintained, and the interfacial resistance between the negative electrode layer and the solid electrolyte layer may be reduced, thus enabling preparation of an all-solid secondary battery having high rate capability and lifespan characteristics. The all-solid secondary battery may be, for example, a high energy compact battery having an oxide-based solid electrolyte layer.

In the compound of Formula 1, an atomic ratio (M2M3X/M1) of M2M3X to M1 ion may be in a range of about 1 to about 5.51, about 1 to about 5.5, about 1.5 to about 5, about 2 to about 4.5, about 2.5 to about 4.5, or about 3.1 to about 4.

When the atomic ratio M2M3X/M1 is within any of these ranges, lithium diffusion may increase, and the interfacial resistance between the negative electrode layer and the solid electrolyte layer may be reduced, thus enabling preparation of an all-solid secondary battery having high rate capability and lifespan characteristics.

In the compound of Formula 1, an atomic ratio (M1M2M3/X) of M1M2M3 to X ion may be about 1.2 or greater, about 1.2 to about 3.9, about 1.2 to about 6.1, about 1.2 to about 5.0, about 1.2 to about 4.5, about 1.6 to about 3.9, about 2 to about 3.9, about 2.6 to about 3.9. When the atomic ratio M1M2M3/X is within any of these ranges, oxygen in the multi-component metal composite may be reduced, and the interfacial resistance between the negative electrode layer and the solid electrolyte layer may be reduced, thus enabling preparation of an all-solid secondary battery having high rate capability and lifespan characteristics.

In the compound of Formula 1, a content of M1 may be in a range of about 10 atomic percent (atom %) to about 50 atom %, about 15 atom % to about 45 atom %, or about 20 atom % to about 40 atom %, a content of M2 may be in a range of about 0.1 atom % to about 30 atom %, about 1 atom % to about 25 atom %, or about 5 atom % to about 20 atom %, a content of M3 may be in a range of about 0.1 atom % to about 30 atom %, about 1 atom % to about 25 atom %, or about 5 atom % to about 20 atom %, and a content of X may be in a range of about 0.1 atom % to about 50 atom %, about 1 atom % to about 40 atom %, or about 5 atom % to about 30 atom %, based on a total atomic content of the compound of Formula 1.

The compound of Formula 1 may include, for example, $Li_aGe_bTe_cO_d$ (wherein $0.1 \leq a \leq 1$, $0 < b \leq 3$, $0 < c \leq 2$, and $0.5 \leq d \leq 2$), $Li_aCu_bTe_cO_d$ (wherein $0.1 \leq a \leq 1$, $0 < b \leq 3$, $0 < c \leq 2$, and $0.5 \leq d \leq 2$), $Li_aSb_bTe_cO_d$ (wherein $0.1 \leq a \leq 1$, $0 < b \leq 3$, $0 < c \leq 2$, and $0.5 \leq d \leq 2$), $Li_aGe_bSe_cO_d$ (wherein $0.1 \leq a \leq 1$, $0 < b \leq 3$, $0 < c \leq 2$, and $0.5 \leq d \leq 2$), $Li_aGa_bTe_cO_d$ (wherein $0.1 \leq a \leq 1$, $0 < b \leq 3$, $0 < c \leq 2$, and $0.5 \leq d \leq 2$), $Li_aZn_bTe_cO_d$ (wherein $0.1 \leq a \leq 1$, $0 < b \leq 3$, $0 < c \leq 2$, and $0.5 \leq d \leq 2$), $Li_aBi_bTe_c$ $O_d$ (wherein $0.1 \leq a \leq 1$, $0 < b \leq 3$, $0 < c \leq 2$, and $0.5 \leq d \leq 2$), $Li_a$-$Bi_bTe_cO_d$ (wherein $0.1 \leq a \leq 1$, $0 < b \leq 3$, $0 < c \leq 2$, and $0.5 \leq d \leq 2$), $Li_aAu_bTe_cO_d$ (wherein $0.1 \leq a \leq 1$, $0 < b \leq 2$, $0 < c \leq 1$, and $0.5 \leq d \leq 2$), $Li_aAs_bTe_cO_d$ (wherein $0.1 \leq a \leq 1$, $0 < b \leq 3$, $0 < c \leq 2$, and $0.5 \leq d \leq 2$), $Li_aSn_bTe_cO_d$ (wherein $0.1 \leq a \leq 1$, $0 < b \leq 1$, $0 < c \leq 1$, and $0.5 \leq d \leq 2$), $Li_aSr_bTe_cO_d$ (wherein $0.1 \leq a \leq 1$, $0 < b \leq 1$, $0 < c \leq 1$, and $0.5 \leq d \leq 2$), $Li_aY_bTe_cO_d$ (wherein $0.1 \leq a \leq 1$, $0 < b \leq 3$, $0 < c \leq 2$, and $0.5 \leq d \leq 2$), $Li_aZr_bTe_cO_d$ (wherein $0.1 \leq a \leq 1$, $0 < b \leq 5$, $0 < c \leq 1$, and $0.5 \leq d \leq 2$), $Li_aNb_bTe_c$ $O_d$ (wherein $0.1 \leq a \leq 1$, $0 < b \leq 2$, $0 < c \leq 1$, and $0.5 \leq d \leq 2$), $Li_aMo_b$-$Te_cO_d$ (wherein $0.1 \leq a \leq 1$, $0 < b \leq 2$, $0 < c \leq 1$, and $0.5 \leq d \leq 2$), $Li_aAg_bTe_cO_d$ (wherein $0.1 \leq a \leq 1$, $0 < b \leq 3$, $0 < c \leq 2$, and $0.5 \leq d \leq 2$), $Li_aIn_bTe_cO_d$ (wherein $0.1 \leq a \leq 1$, $0 < b \leq 3$, $0 < c \leq 2$, and $0.5 \leq d \leq 2$), $Li_aPd_bTe_cO_d$ (wherein $0.1 \leq a \leq 1$, $0 < b \leq 2$, $0 < c \leq 1$, and $0.5 \leq d \leq 2$), or a combination thereof.

In the first negative active material layer, during alloying/dealloying with lithium, high lithium diffusion may be maintained, and an alloy layer having low particle fluidity and agglomeration may be formed at an interface with the solid electrolyte layer.

The metal alloy used to form the first negative active material layer may have low fluidity and may maintain the original state during charge and discharge. For example, when the first negative active material layer comprises, or in an aspect consists of, a metal with high fluidity, the metal moves toward Li metal during charge, but LiGeTeO maintains its original layer shape even during charge and discharge. Such fluidity tendency increases when the eutectic temperature is low when forming a lithium (Li) alloy or oxide.

The all-solid secondary battery having the first negative active material layer may have improved high-rate characteristics by reducing an interfacial resistance of the battery cell. In addition, by allowing lithium to be precipitated mainly at the interface between the second negative active material layer and the negative electrode current collector, the current concentration may be continuously relieved under long-term operation with a high current density, thereby improving lifespan characteristics.

The first negative active material layer comprises a lithium metal alloy oxide layer that enables fast Li diffusion and is reversible after alloying/dealloying with lithium.

The all-solid secondary battery may further include a third negative active material layer between the negative electrode current collector and the first negative active material layer. The third negative active material layer may be a metal layer including lithium or lithium alloy. The third negative active material layer may be, for example, a deposition layer formed by charging the battery.

In the first negative active material layer, a lithium ion diffusivity may be controlled to be about $1 \times 10^{14}$ square centimeter per second ($cm^2/sec$) or greater at a temperature of 25° C. lithium introduced in the first negative active material layer may be rapidly migrated to the second negative active material layer. As a result, an all-solid secondary battery may be manufactured, which may have improved long-term lifespan by maintaining the bonding force between the solid electrolyte layer and the negative electrode layer during charge and discharge.

FIG. 1A is a view of a stacked structure of a negative electrode structure having a multi-layered structure according to an embodiment.

As shown in FIG. 1A, a negative electrode structure 2 may include a negative electrode layer 20 and a solid electrolyte layer 30 and the negative electrode layer 20 may have a structure including a negative electrode current collector 21 and a first negative active material layer 22 on the negative electrode current collector 21. The first negative active material layer 22 may include a compound of Formula 1 according to an embodiment.

Figure 1B:
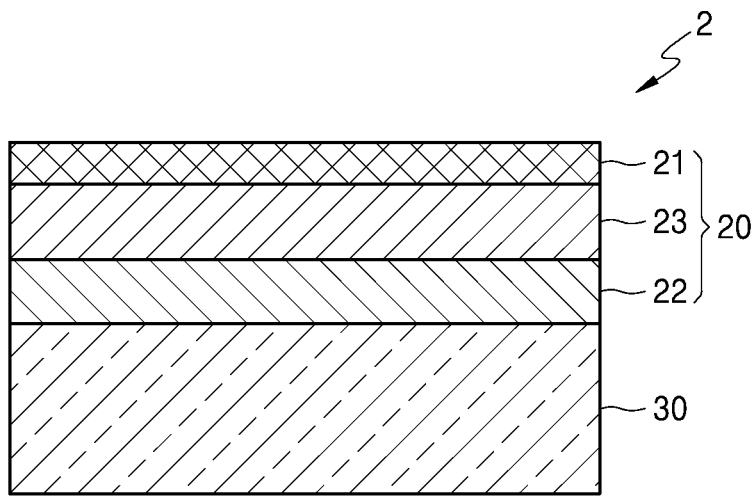
FIG. 1B is a cross-sectional view of another embodiment of a negative electrode structure for an all-solid secondary battery.

The negative electrode structure shown in FIG. 1B may have a structure in which a second negative active material layer 23 may be between the negative electrode current collector 21 and the first negative active material layer 22.

The lithium ion diffusivity in the first negative active material layer may be about $1 \times 10^{-14}$ $cm^2/sec$ or greater at a temperature of 25° C., which may be equal to or greater than a lithium ion diffusivity the second negative active material layer.

As the first negative active material layer 22 has a high lithium ion diffusivity, lithium introduced to the first negative active material layer 22 may rapidly migrate to the second negative active material layer 23, and local lithium precipitation may be prevented in the first negative active material layer 22 or at an interface between the first negative active material layer 22 and the solid electrolyte layer 30. The lithium ion diffusivity of the first negative active material layer 22 may be, for example, about $1 \times 10^{-14}$ $cm^2/sec$ or greater, about $1 \times 10^{-13}$ $cm^2/sec$ or greater, about $1 \times 10^{-12}$ $cm^2/sec$ or greater, about $1 \times 10^{-11}$ $cm^2/sec$ or greater, about $1 \times 10^{-10}$ $cm^2/sec$ or greater, or about $5 \times 10^{-10}$ $cm^2/sec$ or greater, or about $1 \times 10^{-14}$ $cm^2/sec$ to about $1 \times 10^{-3}$ $cm^2/sec$, about $1 \times 10^{-13}$ $cm^2/sec$ to about $1 \times 10^{-4}$ $cm^2/sec$, or about $1 \times 10^{-12}$ $cm^2/sec$ to about $1 \times 10^{-5}$ $cm^2/sec$, at a temperature of 25° C. The lithium ion diffusivity of the second negative active material layer 23 may be, for example, about $1 \times 10^{-15}$ $cm^2/sec$ or greater, about $1 \times 10^{-14}$ $cm^2/sec$ or greater, about $1 \times 10^{-13}$ $cm^2/sec$ or greater, about $1 \times 10^{-12}$ $cm^2/sec$ or greater, about $1 \times 10^{-11}$ $cm^2/sec$ or greater, or about $5 \times 10^{-11}$ $cm^2/sec$ or greater, or about $1 \times 10^{-15}$ $cm^2/sec$ to about $1 \times 10^{-4}$ $cm^2/sec$, about $1 \times 10^{-13}$ $cm^2/sec$ to about $1 \times 10^{-5}$ $cm^2/sec$, about $1 \times 10^{-11}$ $cm^2/sec$ to about $1 \times 10^{-4}$ $cm^2/sec$, at a temperature of 25° C.

The first negative active material layer 22 may include an oxide including a metal or a metal alloy that may react with lithium to form an alloy or a compound. An oxide containing the metal alloy may have high lithium diffusion and low particle fluidity, and thus, stable interfacial contact may be maintained during high-rate charging and discharging, and a rapid lithium diffusion phase may be maintained even after lithium alloying and dealloying processes.

The compound of Formula 1 may be, for example, a compound of Formula 2, a compound of Formula 3, or a combination thereof:

$$Li_aGe_bTe_cO_d \qquad \text{Formula 2}$$

wherein, in Formula 2, $0.1 \leq a \leq 1$, $0 < b \leq 3$, $0 < c \leq 2$, and $0.5 \leq d \leq 2$. In Formula 2, b may be in a range of about 0.05 to about 1.25, about 0.35 to about 1.25, or about 0.55 to about 1.25, c may be in a range of about 0.45 to about 1.44, about 0.45 to about 1.42, or about 0.45 to about 1.39, and d may be in a range of about 0.5 to about 1.9, about 0.54 to about 1.86, or about 0.57 to about 1.81.

$$Li_aCu_bTe_cO_d \qquad \text{Formula 3}$$

wherein, in Formula 3, $0.1 \leq a \leq 1$, $0 < b \leq 3$, $0 < c \leq 2$, and $0.5 \leq d \leq 2$.

The compound of Formula 2 may be, for example, $Li_1Ge_{0.79}Te_{0.53}O_{1.81}$, $Li_1Ge_{1.25}Te_{1.39}O_{1.39}$, $Li_1Ge_{1.07}Te_{0.83}O_{0.73}$, $Li_1Ge_{0.55}Te_{0.45}O_{0.57}$, or a combination thereof.

The compound represented by Formula 3 may be, for example, $Li_1Cu_{2.34}Te_{1.44}O_{0.76}$.

The compound of Formula 1 may be, for example, at least one alloy of $Li_{1.0}Ge_{1.2}Te_{1.14}O_{1.4}$, $Li_aGe_{0.35}Te_{0.65}$ $(Ge_{0.7}Te_{1.3})O_d$, $Li_aGe_{0.5}Te_1(Ge_1Te_2)O_d$, $Li_aGe_{0.54}Te_1$ $(Ge_{1.08}Te_2)O_d$, $Li_aGe_{0.6}Te_1(Ge_{1.2}Te_2)O_d$, $Li_aGe_{0.65}Te_1$ $(Ge_{1.3}Te_2)O_d$, $Li_aGe_{0.7}Te_1(Ge_{1.4}Te_2)O_d$, $Li_aGe_{0.75}Te_1$ $(Ge_{1.5}Te_2)O_d$, $Li_aGe_{0.8}Te_1(Ge_{1.6}Te_2)O_d$, $Li_aGe_{0.85}Te_1$ $(Ge_{1.7}Te_2)O_d$, $Li_aGe_{0.9}Te_1(Ge_{1.8}Te_2)O_d$, $Li_aGe_{0.95}Te_1$ $(Ge_{1.9}Te_2)O_d$, $Li_aGa_2Te_3O_d$, $Li_aTeZn_2O_d$, $Li_aBi_3Te_2O_d$, $Li_aGeSeO_d$, $LiaSb_3Te_2O_d$, $Li_aTePbO_d$, $Li_aAuTe_2O_d$, $Li_aAs_3Te_2O_d$, $Li_aSnTeO_d$, $Li_aSrTeO_d$, $Li_aY_3Te_2O_d$, $Li_aNbTe_2O_d$, $Li_aMoTe_2O_d$, $LiaAg_2TeO_d$, $Li_aCdTeO_d$, $Li_aIn_3Te_2O_d$, $Li_aSnTeO_d$, $Li_aPdTe_2O_d$, $Li_aBiSbTeO_d$, $Li_aBi\text{-}SeTeO_d$, $Li_aSeSbTeO_d$, $Li_aGeSbTeO_d$, $Li_aGeSbSeTeO_d$, or a combination thereof. In the formulae above, a may be in a range of about 0.1 to about 1, about 0.3 to about 1, about 0.5 to about 1, or about 0.7 to about 1, and d may be in a range of about 0.5 to about 2, about 0.52 to about 1.9, about 0.54 to about 1.86, or about 0.57 to about 1.81.

In the metal alloy M2M3, a molar ratio of M2 and M3 may be in a range of about 1:1 to about 1:500, about 1:1 to about 1:300, about 1:1 to about 1:200, about 1:5 to about 1:180, about 1:8 to about 1:100, or about 1:1.85 to about 1:50.

The first negative active material layer may include lithium GeTe binary alloy oxide. The lithium GeTe binary alloy oxide may have low fluidity, as compared with, for example, a monometallic metal such as silver, such that stable interfacial contact may be maintained during high-rate charge and discharge. In addition, the first negative active material layer may not act as a kinetic barrier because the first negative active material layer may maintain a crystal structure (rhombohedral structure) in which Li diffusion is fast even after alloying/dealloying with Li. As the first negative active material layer includes the above-described alloy oxide, short circuit of the all-solid secondary battery may be prevented, and cycle characteristics of the all-solid secondary battery may be improved.

When the first negative active material layer includes a Ge—Te alloy or oxide, a molar ratio of Ge to Te may be in a range of about 2.5:1 to about 1:500, about 1:1 to about 1:500, about 1:1 to about 1:300, or about 1:1 to about 1:200.

A reduction potential of a lithium ion in the first negative active material layer may be greater than a reduction potential of the solid electrolyte. The reductive decomposition reaction of the solid electrolyte may be suppressed because the reduction potential of the lithium ion during charge of the metal alloy included in the first negative active material layer is greater than the reduction potential of the solid electrolyte. Therefore, the decomposition of the solid electrolyte at the interface between the solid electrolyte layer 30 and the first negative active material layer 22 may be suppressed, the local precipitation of lithium may be suppressed, and a lithium deposition layer having a uniform surface may be formed. As a result, the stability of the solid electrolyte layer may be increased during charge and discharge, and the reversible deposition/dissolution of the lithium layer may be possible, thereby suppressing short circuit and improving cycle characteristics of the all-solid secondary battery.

The reduction potential of a lithium ion of the first negative active material layer is a potential that may allow forming a lithium-metal alloy, such as a solid solution, by reducing the lithium ion with a metal or a metal alloy that may form a compound or an alloy with lithium, wherein the compound or the alloy formed with lithium is a material for forming the first negative active material layer. That is, the reduction potential of the lithium ion is the potential that the metal alloy maintains during a charge process. The reduction potential of the solid electrolyte is a potential at which a transition metal contained in the solid electrolyte may be reduced, and decomposition of the solid electrolyte may proceed. A reduction potential of the lithium ion of the first negative active material layer may be, for example, in a range of about 0.05 Volts ($V$ vs. $Li^+/Li$) to about 0.6 V (vs. $Li^+/Li$). Alternatively, the reduction potential may be expressed as a reduction decomposition potential of a solid electrolyte or a decomposition potential of a solid electrolyte. For example, a reduction potential of $Li_7La_3Zr_2O_{12}$ (LLZO) may be about 0.05 V (vs. $Li^+/Li$).

A thickness of the first negative active material layer 22 may be in a range of about 5 nanometers (nm) to about 500 nm, about 5 nm to about 200 nm, about 10 nm to about 200 nm, about 15 nm to about 150 nm, or about 20 nm to about 100 nm. When the thickness of the first negative active material layer 22 is within any of these ranges, an all-solid secondary battery with improved resistance and capacity characteristics may be manufactured.

The first negative active material layer 22 may include the compound of Formula 1.

The compound of Formula 1 may include, for example, lithium tellurium alloy oxide, lithium selenium alloy oxide, or a combination thereof.

A thickness ratio of the first negative active material layer to the second negative active material layer may be, for example, in a range of about 1:50 to about 1:100, about 1:55 to about 1:90, or about 1:60 to about 1:80.

Figure 2:
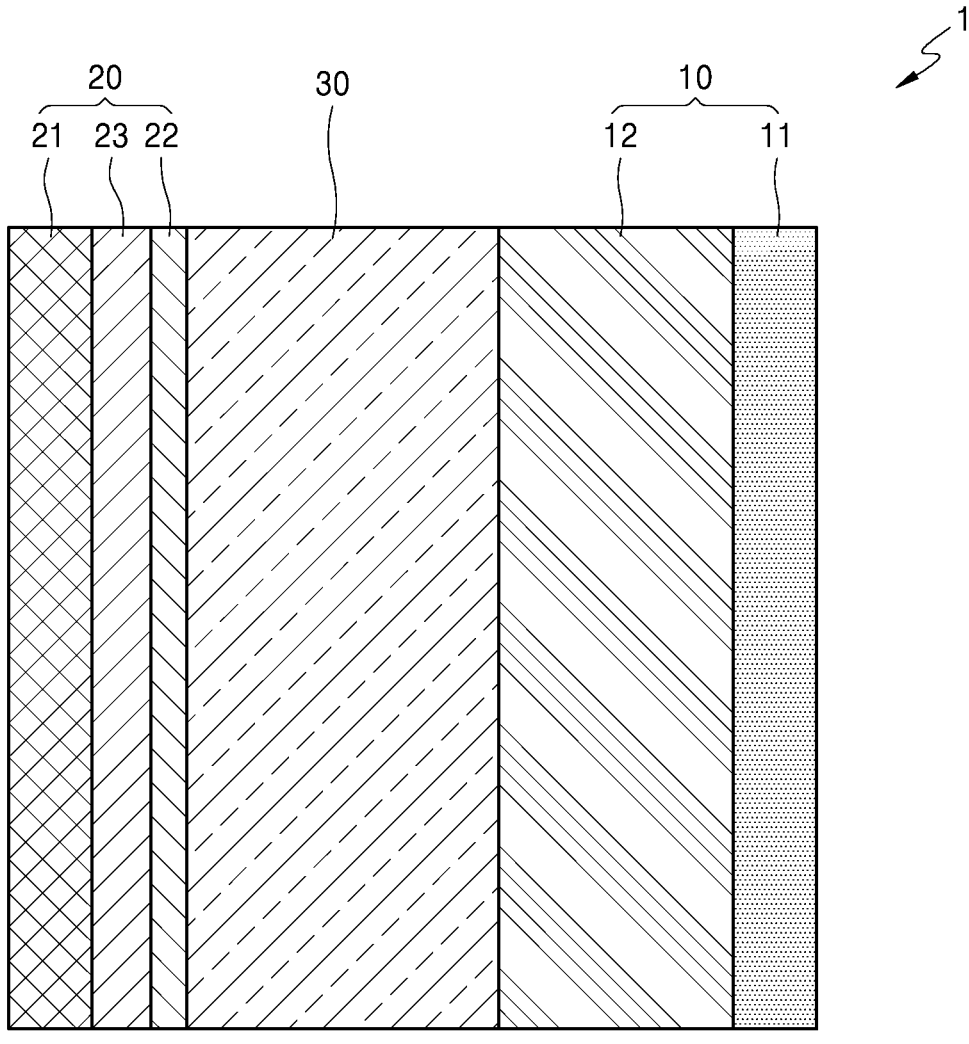
FIG. 2 is a cross-sectional view of an embodiment of an all-solid secondary battery.

FIG. 2 is a schematic view illustrating a structure of an all-solid battery according to an embodiment.

As shown in FIG. 2, the all-solid battery may include: a positive electrode layer 10 including a positive active material layer 12; a negative electrode layer 20; and a solid electrolyte layer 30 between the positive electrode layer 10 and the negative electrode layer 20 and including a solid electrolyte, wherein the negative electrode layer 20 may include: a negative electrode current collector 21; a first negative active material layer 22 on the negative electrode current collector 21 and in contact with the solid electrolyte layer 30; and a second negative active material layer 23 between the negative electrode current collector 21 and the first negative active material layer 22. The second negative active material layer 23 may be omitted.

The first negative active material layer 22 may include the compound of Formula 1, and the second negative active material layer 23 may include a carbonaceous negative active material or a carbonaceous negative active material and a metal.

A lithium ion diffusivity of the first negative active material layer may be controlled to be about $1 \times 10^{-14}$ cm$^2$/sec or greater at a temperature of 25° C. The lithium ion diffusivity of the first negative active material layer may be controlled to be equal to or greater than the lithium ion diffusivity of the second negative active material layer.

As the first negative active material layer 22 has a high lithium ion diffusivity, lithium introduced to the first negative active material layer 22 may rapidly migrate to the second negative active material layer 23, and local lithium deposition may be prevented in the first negative active material layer 22 or at an interface between the first negative active material layer 22 and the solid electrolyte layer 30. The lithium ion diffusivity of the first negative active material layer 22 may be, for example, about $1 \times 10^{-14}$ cm$^2$/sec or greater, about $1 \times 10^{-13}$ cm$^2$/sec or greater, about $1 \times 10^{-12}$ cm$^2$/sec or greater, about $1 \times 10^{-11}$ cm$^2$/sec or greater, about $1 \times 10^{-10}$ cm$^2$/sec or greater, or about $5 \times 10^{-10}$ cm$^2$/sec or greater, or about $1 \times 10^{-14}$ cm$^2$/sec to about $1 \times 10^{-3}$ cm$^2$/sec, about $1 \times 10^{-13}$ cm$^2$/sec to about $1 \times 10^{-4}$ cm$^2$/sec, or about $1 \times 10^{-12}$ cm$^2$/sec to about $1 \times 10^{-5}$ cm$^2$/sec, at a temperature of 25° C. The lithium ion diffusivity of the second negative active material layer 23 may be, for example, about $1 \times 10^{-15}$ cm$^2$/sec or greater, about $1 \times 10^{-14}$ cm$^2$/sec or greater, about $1 \times 10^{-13}$ cm$^2$/sec or greater, about $1 \times 10^{-12}$ cm$^2$/sec or greater, about $1 \times 10^{-11}$ cm$^2$/sec or greater, or about $5 \times 10^{-11}$ cm$^2$/sec or greater, or about $1 \times 10^{-15}$ cm$^2$/sec to about $1 \times 10{-4}$ cm$^2$/sec, about $1 \times 10^{-14}$ cm$^2$/sec to about $1 \times 10^{-5}$ cm$^2$/sec, or about $1 \times 10^{-13}$ cm$^2$/sec to about $1 \times 10^{-6}$ cm$^2$/sec, at a temperature of 25° C.

A reduction potential of a lithium ion of the metal alloy M2M3 included in the first negative active material layer 22 may be controlled to be greater than a reduction potential of a solid electrolyte of the solid electrolyte layer 30. A difference between a reduction potential of the lithium ion of the first negative active material layer 22 and a reduction potential of the solid electrolyte may be, for example, about 0.01 V or greater, about 0.02 V or greater, about 0.05 V or greater, about 0.1 V or greater, about 0.2 V or greater, or about 0.3 V or greater. When the difference between the reduction potential of the lithium ion of the first negative active material layer 22 and the reduction potential of the solid electrolyte is within any of these ranges, during charge and discharge, reductive decomposition of the solid electrolyte may be effectively suppressed.

A reduction potential of the lithium ion of the first negative active material layer 22 may be, for example, about 0.05 V or greater, about 0.1 V or greater, about 0.2 V or greater, about 0.3 V or greater, about 0.4 V or greater, or about 0.5 V or greater, or about 0.05 V to about 1 V, about 0.1 V to about 0.8 V, or about 0.2 V to about 0.6V, versus lithium. As the first negative active material layer 22 has such a high reduction potential of lithium ion, decomposition of the solid electrolyte may be suppressed. In addition, a reduction potential of the lithium ion of a metal alloy included in the first negative active material layer 22 may be, for example, about 0.05 V or greater, about 0.1 V or greater, about 0.2 V or greater, about 0.3 V or greater, about 0.4 V or greater, or about 0.5 V or greater, e.g., about 0.05 V to about 1 V, about 0.1 V to about 0.8 V, or about 0.2 V to about 0.6V, versus lithium metal. As the metal alloy included in the first negative active material layer 22 has such a high reduction potential of lithium ion, decomposition of the solid electrolyte may be suppressed. The reduction potential or reductive decomposition potential of a solid electrolyte contained in the solid electrolyte layer 30 may be about 0.2 V or less, about 0.1 V or less, about 0.09 V or less, about 0.07 V or less, about 0.05 V or less, about 0.03 V or less, about 0.02 V or less, or 0.01 V or less, e.g., about 0.2 V to about 0.001 V, or about 0.15 V to about 0.01 V, versus lithium metal. Because the solid electrolyte has such a low reduction potential, the solid electrolyte may provide a broad electrochemically stable voltage window.

The reduction potential of the lithium ion of the first negative active material layer 22 may be greater than the reduction potential of the lithium ion of the second negative active material layer 23. For example, a difference between the reduction potential of the lithium ion of the first negative active material layer 22 and the reduction potential of the lithium ion of the second negative active material layer 23 may be, for example, about 0.01 V or greater, about 0.02 V or greater, about 0.05 V or greater, about 0.1 V or greater, about 0.2 V or greater, or about 0.3 V or greater, e.g., about 0.01 V to about 1 V, or about 0.02 V to about 0.5 V. As the first negative active material layer 22 has a higher reduction potential of the lithium ion than the second negative active material layer 23, even when the reduction potential of the lithium ion of the second negative active material layer 23 is lower than the reduction potential of the solid electrolyte, the reductive decomposition of the solid electrolyte by the second negative active material layer 23 may be effectively suppressed. In addition, a second metal included in the second negative active material layer 23 may be easily selected within a range having a lower reduction potential of a lithium ion, as compared with the first negative active material layer 22 including a metal alloy. For example, a reduction potential of a lithium ion on Ge—Te, which is a metal alloy, may be in a range of about 0.05 V to about 0.6 V. For example, a reduction potential of lithium ions on silver (Ag), which is the second metal, may be about 0.2 V.

In an embodiment, the reduction potential of the lithium ion of the first negative active material layer 22 may be lower than the reduction potential of the lithium ion of the second negative active material layer 23. When the reduction potential of the lithium ion of the first negative active material layer 22 is higher than the reduction potential of the solid electrolyte, the reduction potential of the lithium ion of the first negative active material layer 22 may be lower than the reduction potential of the lithium ion of the second negative active material layer 23.

The first negative active material layer 22 may include only a metal or a metal alloy when assembling a battery, or may be a metal or metal alloy layer including lithium.

A thickness of the first negative active material layer 22 and a thickness of the second negative active material layer 23 may each independently be, for example, about 50 percent (%) or less, about 40% or less, about 30% or less, about 20% or less, or about 10% or less, or about 50% to about 1%, or about 30% to about 5%, of a thickness of the positive active material layer 12. As the thickness of the first negative active material layer 22 and/or the second negative active material layer 23 is less than the thickness of the positive active material layer 12, the energy density of the all-solid secondary battery may be improved.

The thickness of the first negative active material layer 22 may be in a range of about 10 nm to about 500 nm, about 15 nm to about 480 nm, about 20 nm to about 450 nm, about 30 nm to about 420 nm, or for example, about 50 nm to about 300 nm. The thickness of the second negative active material layer 23 may be, for example, about 1 nm to about 100 micrometer (μm), about 10 nm to about 100 μm, about 100 nm to about 100 μm, about 1 μm to about 100 μm, about 5 μm to about 90 μm, about 10 μm to about 80 μm, about 15 μm to about 80 μm, about 20 μm to about 70 μm, about 20 μm to about 55 μm, about 1 nm to about 500 nm, about 10 nm to about 100 nm, about 10 nm to about 150 nm, about 10 nm to about 300 nm, about 10 nm to about 400 nm, or about 10 nm to about 500 nm. When the first negative active material layer 22 and the second negative active material layer 23 each have a thickness within any of these ranges, short circuit may be suppressed, and cycle characteristics of the all-solid secondary battery may be improved. The first negative active material layer 22 and/or the second negative active material layer 23 may be formed by, for example, vacuum-deposition, sputtering, or plating. However, methods are not limited thereto. Any suitable method to form a negative active material layer available in the art may be used.

The second negative active material layer 23 may include, for example, a binder and a negative active material in a form of a particle.

An average particle diameter of the negative active material in the form of the particle included in the second negative active material layer 23 may be, for example, about 4 μm or less, about 3 μm or less, about 2 μm or less, about 1 μm or less, or about 900 nm or less. The average particle diameter of the negative active material in the form of the particle may be, for example, in a range of about 10 nm to about 4 μm, about 10 nm to about 2 μm, about 10 nm to about 1 μm, or about 10 nm to about 900 nm. When the negative active material in the form of the particle has an average particle diameter within any of these ranges, upon charging and discharging of a battery, reversible absorbing and/or desorbing of lithium may be facilitated. The average particle diameter of the second negative active material may be, for example, a median diameter (D50) measured using a laser particle-size analyzer.

The negative active material in the form of the particle included in the second negative active material layer 23 may include, for example, a carbonaceous negative active material and optionally a metal or a metalloid negative active material.

The carbonaceous negative active material in a form of a particle may be amorphous carbon. Amorphous carbon may be, for example, carbon black (CB), acetylene black (AB), furnace black (FB), ketjen black (KB), or graphene. But embodiments are not limited thereto. Any suitable amorphous carbon used in the art may be used. Amorphous carbon is carbon that does not have crystallinity or has very low crystallinity, and is distinguished from crystalline carbon or graphite-based carbon.

The metal or the metalloid negative active material in a form of a particle may be the metal alloy including, for example, indium (In), silicon (Si), gallium (Ga), tin (Sn), aluminum (Al), titanium (Ti), zirconium (Zr), niobium (Nb), germanium (Ge), antimony (Sb), bismuth (Bi), zinc (Zn), gold (Au), platinum (Pt), palladium (Pd), iron (Fe), cobalt (Co), chromium (Cr), magnesium (Mg), cesium (Cs), cerium (Ce), lanthanum (La), or a combination thereof. The metal or the metalloid negative active material in the form of the particle included in the second negative active material layer 23 may be the second metal including, for example, gold (Au), platinum (Pt), palladium (Pd), silicon (Si), silver (Ag), aluminum (Al), bismuth (Bi), tin (Sn), zinc (Zn), or a combination thereof. For example, nickel (Ni) does not form an alloy with lithium and thus is not the metal or the metalloid negative active material.

The second negative active material layer 23 may include the negative active material in the form of the particle or may include a mixture of a plurality of different negative active materials in the form the particle. For example, the second negative active material layer 22 may only include a first particle comprising amorphous carbon or include a second particle comprising metal alloy of indium (In), silicon (Si), gallium (Ga), tin (Sn), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Cs), cerium (Ce), Molybdenum (Mo), lanthanum (La), or a combination thereof.

For example, the second negative active material layer 23 may include a mixture or a composite of the first particle comprising amorphous carbon and the second particle comprising metal alloy of indium (In), silicon (Si), gallium (Ga), tin (Sn), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Cs), cerium (Ce), Molybdenum (Mo), lanthanum (La), or a combination thereof. A content of the second particle may be in a range of about 8 weight percent (wt %) to about 60 wt %, about 10 wt % to about 50 wt %, about 15 wt % to about 40 wt %, or about 20 wt % to about 30 wt %, based on a total weight of the mixture or the composite. When the second particle has a content within any of these ranges, for example, cycle characteristics of the all-solid secondary battery 1 may be further improved.

For example, the second negative active material layer 23 may only include the first particle comprising amorphous carbon or include the second particle comprising a second metal of gold (Au), platinum (Pt), palladium (Pd), silicon (Si), silver (Ag), aluminum (Al), bismuth (Bi), tin (Sn), zinc (Zn), or a combination thereof. In an embodiment, the second negative active material layer 23 may include the first particle comprising amorphous carbon and gold (Au), platinum (Pt), palladium (Pd), silicon (Si), silver (Ag), aluminum (Al), bismuth (Bi), tin (Sn), zinc (Zn), or a combination thereof, in an aspect, wherein a ratio of amorphous carbon to gold (Au), platinum (Pt), palladium (Pd), silicon (Si), silver (Ag), aluminum (Al), bismuth (Bi), tin (Sn), zinc (Zn), or a combination thereof may be, for example, about 10:1 to about 1:2, about 5:1 to about 1:1, or about 4:1 to about 2:1, but embodiments are not limited thereto. The ratio may be determined according to the desired characteristics of the all-solid secondary battery 1.

The negative active material included in the second negative active material layer 23 may include, for example, a mixture or a composite of the first particle comprising amorphous carbon and the second particle comprising a metal or a metalloid. The mixture is a simple mixture of the first particle and the second particle or a mixture of the first particle and the second particle physically bound by a binder. The metal or the metalloid may include, for example, indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof. In an embodiment, the metalloid may be a semiconductor. A content of the second particle may be in a range of about 8 wt % to about 60 wt %, about 10 wt % to about 50 wt %, about 15 wt % to about 40 wt %, or about 20 wt % to about 30 wt %, based on the total weight of the mixture or the composite. When the second particle has a content within any of these ranges, for example, cycle characteristics of the all-solid secondary battery 1 may be further improved.

The second negative active material layer 23 may include, for example, a binder. The binder may be, for example, styrene-butadiene rubber (SBR), polytetrafluoroethylene, polyfluoride vinylidene, polyethylene, vinylidenefluoride/hexafluoropropylene copolymer, polyacrylonitrile, or polymethyl methacrylate. However, embodiments are not limited thereto. Any suitable binder available in the art may be used. The binder may include single or multiple different binders.

As the second negative active material layer 23 includes a binder, the second negative active material layer 23 may be stabilized on the negative electrode current collector 21. In addition, cracks in the second negative active material layer 23 may be suppressed despite the change in volume and/or relative position of the second negative active material layer 23 during charge and discharge. For example, when the second negative active material layer 23 does not include a binder, the second negative active material layer 23 may be easily separated from the negative electrode current collector 21. In a portion where the second negative active material layer 23 is separated from the negative electrode current collector 21, the negative electrode current collector 21 may be exposed to be in contact with the solid electrolyte layer 30, thereby increasing a possibility of a short circuit. The second negative active material layer 23 may be prepared by coating a slurry in which materials of the second negative active material layer 23 are dispersed, on the negative electrode current collector 21, and drying the coated slurry. By including the binder in the second negative active material layer 23, the negative active material may be stably dispersed in the slurry. For example, when the slurry is coated onto the negative electrode current collector 21 by screen printing, screen blockage (e.g., blockage due to agglomeration of a negative active material) may be prevented.

For example, the negative electrode current collector 21 may include a material that is not reactive to lithium and do not form an alloy or a compound with lithium. The material of the negative electrode current collector 21 may include, for example, copper (Cu), stainless steel, titanium (Ti), iron (Fe), cobalt (Co), or nickel (Ni). But embodiments are not limited thereto. Any suitable electrode current collector available in the art may be used. The negative electrode current collector 21 may include one type of the metal described above, or an alloy of at least two metals or a coating material. The negative electrode current collector 21 may be, for example, in a plate shape or a foil shape.

The second negative active material layer 23 may further include an additive used in the all-solid secondary battery 1 in the related art, such as a filler, a dispersing agent, or an ion conductive agent.

In the all-solid secondary battery 1, for example, a third negative active material layer may be between the negative electrode current collector 21 and the second negative active material layer 23 or between the first negative active material layer 22 and the second negative active material layer

23. The third negative active material layer may be a metal layer including lithium or lithium alloy. The third negative active material layer may be formed by charging. Therefore, as the third negative active material layer is a metal layer containing lithium, the third negative active material layer may act as, for example, a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, or a Li—Si alloy, but embodiments are not limited thereto. Any suitable lithium alloy available in the art may be used. The third negative active material layer may comprise one of the aforementioned alloys, lithium, or several types of alloys.

A thickness of the third negative active material layer is not particularly limited, but for example, may be in a range of about 1 μm to 1,000 μm, 1 μm to 500 μm, 1 μm to 200 μm, 1 μm to 150 μm, 1 μm to 100 μm, or 1 μm to 50 μm. When the thickness of the third negative active material layer is within any of these ranges, cycle characteristics may be improved while the third negative active material layer acting as a lithium reservoir. The third negative active material layer, for example, may be a metal foil with the thickness in this range.

In the all-solid secondary battery 1, the third negative active material layer may be, for example, disposed between the negative electrode current collector 21 and the second negative active material layer 23 or between the first negative active material layer 22 and the second negative active material layer 23 before assembly of the all-solid secondary battery 1. In an embodiment, in the all-solid secondary battery 1, the third negative active material layer may be, for example, deposited by charging between the negative electrode current collector 21 and the second negative active material layer 23 or between the first negative active material layer 22 and the second negative active material layer 23, after assembly of the all-solid secondary battery 1.

When the third negative active material layer is disposed between the negative electrode current collector 21 and the second negative active material layer 23 or between the negative active material layer 22 and the second negative active material layer 23, before assembly of the all-solid secondary battery 1, the third negative active material layer is a metal layer including lithium and may act as a lithium reservoir. Cycle characteristics of the all-solid secondary battery 1 containing a third negative active material layer may be further improved. For example, a lithium foil may be between the negative electrode current collector 21 and the second negative active material layer 23 or between the first negative active material layer 22 and the second negative active material layer 23, before assembly of the all-solid secondary battery 1.

When the third negative active material layer is disposed by charging after assembly of the all-solid secondary battery 1, the energy density of the all-solid secondary battery 1 may increase because the third negative active material layer is not included during assembly of the all-solid secondary battery 1. For example, when charging the all-solid secondary battery 1, charging may be performed in excess of a charging capacity of the first negative active material layer 22 and the second negative active material layer 23. That is, the first negative active material layer 22 and the second negative active material layer 23 may be overcharged. In the beginning of charging, lithium may be stored in the first negative active material layer 22 and the second negative active material layer 23. That is, the negative active material included in the first negative active material layer 22 and the second negative active material layer 23, may form an alloy or a compound with a lithium ion that has migrated from the positive electrode layer 10. When charging exceeds the capacity of the first negative active material layer 22 and the second negative active material layer 23, for example, lithium is deposited at a back surface of the second negative active material layer 23, that is, between the negative electrode current collector 21 and the second negative active material layer 23. A metal layer corresponding to the third negative active material layer may be formed by the precipitated lithium. In an embodiment, when charging exceeds the capacity of the first negative active material layer 22 and the second negative active material layer 23, for example, lithium is deposited at a front surface of the second negative active material layer 23, that is, between the first negative active material layer 22 and the second negative active material layer 23. A metal layer corresponding to the third negative active material layer may be formed by the precipitated lithium. The third negative active material layer is a metal layer mainly including lithium (i.e., metal lithium). These results, for example, are obtained when the negative active material included in the first negative active material layer 22 and the second negative active material layer 23 comprises a material which forms an alloy or a compound with lithium. During discharge, lithium in the first negative active material layer 22, the second negative active material layer 23 and the third negative active material layer, i.e., the metal layer, may be ionized and move towards the positive electrode layer 10. Thus, lithium may be used as a negative active material in the all-solid secondary battery 1. In addition, as the first negative active material layer 22 and/or the second negative active material layer 23 covers the third negative active material layer, the first negative active material layer 22 and/or the second negative active material layer 23 may act as a protective layer for the third negative active material layer, i.e., the metal layer. In addition, the first negative active material layer 22 and/or the second negative active material layer 23 may serve to inhibit precipitation growth of lithium dendrites. Therefore, short circuit and capacity degradation of the all-solid secondary battery 1 may be suppressed, and as a result, cycle characteristics of the all-solid secondary battery 1 may be improved.

The thickness of the first negative active material layer 22 may be, for example, about 5% to about 150%, about 10% to about 120%, about 20% to about 100%, about 30% to about 80%, or about 33% to about 66% of the thickness of the third negative active material layer after charging. When the thickness of the first negative active material layer 22 is too thin, it may be difficult to serve as the first negative active material layer 22. When the thickness of the first negative active material layer 22 is too thick, energy density of the all-solid secondary battery 1 may decrease.

In addition, when the third negative active material layer is disposed by charging after assembly of the all-solid secondary battery 1, an area between the negative electrode current collector 21 and the first negative active material layer 22 and the second negative active material 23 may be, for example, a Li-free area that may not contain lithium (Li) in an initial state or after discharge state of the all-solid secondary battery.

Solid Electrolyte Layer

As shown in FIG. 2, the solid electrolyte layer 30 may include a solid electrolyte between the positive electrode layer 10 and the negative electrode layer 20.

The solid electrolyte may be, for example, an oxide-based (i.e., oxide) solid electrolyte, a sulfide-based (i.e., sulfide) solid electrolyte, or a combination thereof. The oxide-based solid electrolyte may be $Li_{1+x+y}Al_xTi_{2-x}Si_yP_{3-y}O_{12}$ (wherein $0<x<2$ and $0\leq y<3$), $BaTiO_3$, $Pb(Zr_pTi_{1-p})O_3$(PZT, $0\leq p\leq 1$), $Pb_{1-x}La_xZr_{1-y}$ $Ti_yO_3$(PLZT) (wherein $0\leq x<1$ and $0\leq y<1$), $Pb(Mg_{1/3}Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (wherein $0<x<2$ and $0<y<3$), $Li_xAl_yTi_z(PO_4)_3$ (wherein $0<x<2$, $0<y<1$, and $0<z<3$), $Li_{1+x+y}(Al_pGa_{1-p})_x(Ti_qGe_{1-q})_{2-x}$ $Si_yP_{3-y}$ $O_{12}$ (wherein $0\leq x\leq 1$, $0\leq y\leq 1$, $0\leq p\leq 1$, and $0\leq q\leq 1$), $Li_xLa_yTiO_3$ (wherein $0<x<2$ and $0<y<3$), $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (wherein M=Te, Nb, or Zr, and x may be an integer from 1 to 10), or a combination thereof. The solid electrolyte may be prepared by sintering. For example, the oxide-based solid electrolyte may be a garnet-type solid electrolyte $Li_7La_3Zr_2O_{12}$ (LLZO), $Li_{3+x}La_3Zr_{2-a}M_aO_{12}$ (M doped LLZO, wherein M=Ga, W, Nb, Ta, or Al, and x may be an integer from 1 to 10, $0\leq a<2$), or a combination thereof. As used herein, the term "garnet" or "garnet-type" means that the compound is isostructural with garnet, e.g., $Mg_3Al_2$ $(SiO_4)_3$.

In an embodiment, the solid electrolyte may be, for example, a sulfide-based solid electrolyte. The sulfide-based solid electrolyte may be, for example, $Li_2S$—$P_2S_5$, $Li_2S$—$P_2S_5$—LiX (wherein X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are positive integers, and Z is Ge, Zn, or Ga), $Li_2S$—$GeS_2$, $Li_2S$—$SiS_2$—$Li_3PO_4$, $Li_2S$—$SiS_2$-$Li_pMO_q$ (wherein p and q are positive integers, and M is P, Si, Ge, B, Al, Ga, or In), $Li_{7-x}PS_{6-x}Cl_x$, wherein $0<x<2$, $Li_{7-x}PS_{6-x}Br_x$ (wherein $0<x<2$), $Li_{7-x}PS_{6-x}I_x$ (wherein $0<x<2$), or a combination thereof. The sulfide-based solid electrolyte may be prepared by performing a melt quenching method or a mechanical milling method on a start material, e.g., $Li_2S$ or $P_2S_5$. Subsequently, heat treatment may be performed thereon. The sulfide-based solid electrolyte may be an amorphous sulfide solid electrolyte, a crystalline sulfide solid electrolyte, or a mixture thereof.

In addition, the sulfide-based solid electrolyte may include, for example, at least sulfur (S), phosphorus (P), and lithium (Li), as constituting elements, of the sulfide-based solid electrolyte materials described above. For example, the sulfide-based solid electrolyte may be a material including $Li_2S$—$P_2S_5$. When a material including $Li_2S$—$P_2S_5$ is used as the sulfide-based solid electrolyte material, a molar ratio of $Li_2S$ to $P_2S_5$ may be, for example, $Li_2S$:$P_2S_5$ of about 50:50 to about 90:10.

The sulfide-based solid electrolyte may be a compound having an argyrodite crystal structure. The compound having an argyrodite crystal structure may include, for example, $Li_{7-x}PS_{6-x}Cl_x$ (wherein $0<x<2$), $Li_{7-x}$—$PS_{6-x}Br_x$ (wherein $0<x<2$), $Li_{7-x}$—$PS_{6-x}I_x$ (wherein $0<x<2$), or a combination thereof. The sulfide-based solid electrolyte included in the solid electrolyte may be an argyrodite-type compound including $Li_6PS_5Cl$, $Li_6PS_5Br$ $Li_6PS_5I$, or a combination thereof. "Argyrodite" or "argyrodite-type" as used herein means that the compound has a crystal structure isostructural with argyrodite, $Ag_8GeS_6$.

The solid electrolyte layer 30 may further include, for example, a binder. The binder included in the solid electrolyte 30 may be, for example, styrene butadiene rubber (SBR), polytetrafluoroethylene, polyvinylidene fluoride, or polyethylene. But embodiments are not limited thereto. Any suitable binder available in the art may be used. The binder of the solid electrolyte 30 may be identical to or different from the binder of the positive active material layer 12 and the binder of the second negative active material layer 23.

Positive Electrode Layer

The positive electrode layer 10 may include a positive electrode current collector 11 and a positive active material layer 12.

Examples of the positive electrode current collector 11 include a plate or a foil including indium (In), copper (Cu), magnesium (Mg), stainless steel, titanium (Ti), iron (Fe) cobalt (Co), nickel (Ni), zinc (Zn), aluminum (Al), germanium (Ge), lithium (Li), or an alloy thereof. The positive electrode current collector 11 may not be included.

The positive electrode layer 10 may include, for example, a positive active material.

The positive active material may be any suitable positive active material capable of reversible adsorption and desorption of a lithium ion. For example, the positive active material may be lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, or lithium iron phosphate, nickel sulfide, copper sulfide, lithium sulfide, iron oxide, vanadium oxide, or a combination thereof. But embodiments are not limited thereto. Any suitable positive active material available in the art may be used.

The positive active material may be, for example, a compound represented by the following formulae: $Li_aA_{1-b}B'_bD_2$, wherein $0.9 \leq a \leq 1$ and $0 \leq b \leq 0.5$; $Li_aE_{1-b}B'_bO_{2-c}D_c$, wherein $0.9 \leq a \leq 1$, $0 \leq b \leq 0.5$, and $0 \leq c \leq 0.05$; $LiE_{2-b}B'_bO_{4-c}D_c$, wherein $0 \leq b \leq 0.5$ and $0 \leq c \leq 0.05$; $Li_aNi_{1-b-c}Co_bB'_cD_\alpha$, wherein $0.9 \leq a \leq 1$, $0 \leq b \leq 0.5$, $0 \leq c \leq 0.05$, and $0 < \alpha \leq 2$; $Li_a Ni_{1-b-c}Co_bB'_cO_{2-\alpha}F'_\alpha$, wherein $0.9 \leq a \leq 1$, $0 \leq b \leq 0.5$, $0 \leq c \leq 0.05$, and $0 < \alpha < 2$; $Li_aNi_{1-b-c}Co_bB'_cO_{2-\alpha}F'_2$, wherein $0.9 \leq a \leq 1$, $\leq b \leq 0.5$, $0 \leq 5c \leq 0.05$, and $0 < a < 2$; $Li_aNi_{1-b-c}Mn_bB'_cDa$, wherein $0.9 \leq a \leq 1$, $0 \leq b \leq 0.5$, $0 \leq c \leq 0.05$, and $0 < a \leq 2$; $Li_aNi_{1-b-c}Mn_bB'_cO_{2-\alpha}F'_\alpha$, wherein $0.9 \leq a \leq 1$, $0b \leq 0.5$, $0 \leq c \leq 0.05$, and $0 < a < 2$; $Li_aNi_{1-b-c}Mn_bB'_cO_{2-\alpha}F'_2$, wherein $0.9 \leq a \leq 1$, $0 \leq b \leq 0.5$, $0 \leq c \leq 0.05$, and $0 < \alpha < 2$; $Li_aNi_bE_cG_dO_2$, wherein $0.9 \leq a \leq 1$, $0 \leq b \leq 0.9$, and $0 \leq c \leq 0.5$, $0.001 \leq d \leq 0.1$; $Li_aNi_bCo_cMn_dGeO_2$ (wherein $0.9 \leq a \leq 1$, $0 \leq b \leq 0.9$, $0 \leq c \leq 0.5$, $0 \leq d \leq 0.5$, and $0.001 \leq e \leq 0.1$); $Li_aNiGbO_2$ (wherein $0.90 \leq a \leq 1$ and $0.001 \leq b \leq 0.1$); $Li_aCoGbO_2$ (wherein $0.9 \leq a \leq 1$ and $0.001 \leq b \leq 0.1$); $Li_aMnG_bO_2$ (wherein $0.9 \leq a \leq 1$ and $0.001 \leq b \leq 0.1$); $Li_aMn_2GbO_4$ (wherein $0.9 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$, wherein $0 \leq f \leq 2$; $Li_{(3-f)}Fe_2(PO_4)_3$, wherein $0 \leq f \leq 2$; $LiFePO_4$, or a combination thereof. In these compounds, A may be nickel (Ni), cobalt (Co), manganese (Mn), or a combination thereof; B' may be aluminum (Al), Ni, Co, Mn, chromium (Cr), iron (Fe), magnesium (Mg), strontium (Sr), vanadium (V), a rare-earth element, or a combination thereof; D may be oxygen (O), fluorine (F), sulfur (S), phosphorus (P), or a combination thereof; E may be Co, Mn, or a combination thereof; F' may be F, S, P, or a combination thereof; G may be Al, Cr, Mn, Fe, Mg, lanthanum (La), cerium (Ce), Sr, V, or a combination thereof; Q may be titanium (Ti), molybdenum (Mo), Mn, or a combination thereof; I' may be Cr, V, Fe, scandium (Sc), yttrium (Y), or a combination thereof; and J may be V, Cr, Mn, Co, Ni, copper (Cu), or a combination thereof. A compound added with a coating layer formed on one of these compounds may also be used, and a mixture of these compounds and a compound added with a coating layer may also be used. In an embodiment, the coating layer added on a surface of these compounds may include a compound of a coating element of oxide, hydroxide, oxyhydroxide, oxycarbonate, hydroxycarbonate, or a combination thereof, of the coating element. In an embodiment, these compounds of the coating layer may be amorphous or crystalline. In an embodiment, the coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. A method of forming a coating layer may be selected within a range of not affecting physical properties of the positive active material. The coating method may be, for example, a spray coating method or a dipping method. The detailed description of the coating method is omitted herein because the method is easily understood by one of ordinary skill in the art.

The positive active material may include, for example, a lithium salt of a transition metal oxide having a layered rock salt type structure in the lithium transition metal oxide. The term "layered rock salt type structure" as used herein refers to a structure in which an oxygen atom layer and a metal atom layer are alternately and regularly arranged in <111> direction of a cubic rock salt type structure and the respective atom layer thus form a two-dimensional plane. The term "cubic rock salt type structure" as used herein refers to a NaCl type structure as one of crystal structures in which face-centered cubic lattices respectively comprising anions and cations are shifted by only a half of the ridge of each unit lattice. Examples of the lithium transition metal oxide having the layered rock salt type structure may be a ternary lithium transition metal oxide represented by $LiNi_xCo_yAl_zO_2$ (NCA) (wherein $0 < x < 1$, $0 < y < 1$, $0 < z < 1$, and $x+y+z=1$), or $LiNi_xCo_yMn_zO_2$ (NCM) (wherein $0 < x < 1$, $0 < y < 1$, $0 < z < 1$, and $x+y+z=1$). When the positive active material includes the ternary lithium transition metal oxide having the layered rock salt type structure, the all-solid secondary battery 1 may have further improved energy density and thermal stability.

The positive active material may be covered by a covering layer as described above. The covering layer may be any suitable covering layer known as a covering layer of a positive active material in all-solid secondary batteries. Examples of the covering layer include $Li_2O$—$ZrO_2$.

For example, when the positive active material includes nickel (Ni) as a ternary lithium transition metal oxide such as NCA or NCM, the capacity density of the all-solid secondary battery 1 may be increased, thereby allowing a decrease in metal elution of a positive active material while charging. Consequently, the all-solid secondary battery 1 may have improved cycle characteristics.

The positive active material may be, for example, in a particle shape, such as a spherical shape or an oval-spherical shape. A particle diameter of the positive active material is not particularly limited. The diameter may be within a range applicable to a positive active material of an all-solid secondary battery in the related art. A content of the positive active material of the positive electrode layer 10 is not particularly limited. The content may be within a range applicable to a positive electrode layer of an all-solid secondary battery in the related art.

The positive electrode layer 10 may further include an additive, for example, a conductive agent, a binder, a filler, a dispersing agent, and an ion conductive agent, in addition to the positive active material. Examples of the conductive agent include graphite, carbon black, acetylene black, Ketjen black, carbon fibers, or metal powder. Examples of the binder may include, for example, styrene butadiene rubber (SBR), polytetrafluoroethylene, polyvinylidene fluoride, or polyethylene. Moreover, a filler, a dispersing agent, or an ion conductive agent that may be included in the positive electrode layer 10 may be any suitable material for an electrode in a solid secondary battery.

The positive electrode layer 10 may further include a solid electrolyte. The solid electrolyte included in the positive electrode layer 10 may be similar with or different from the solid electrolyte included in the solid electrolyte layer 30. The solid electrolyte will be described in detail with reference to the solid electrolyte layer 30.

The solid electrolyte contained in the positive electrode layer 10 may be, for example, an oxide-based solid electrolyte, a sulfide-based solid electrolyte, or a combination thereof. For a sulfide-based solid electrolyte and an oxide-based solid electrolyte, any suitable sulfide-based solid electrolyte or any suitable oxide-based solid electrolyte used in the solid electrolyte layer may be used.

In an embodiment, the positive electrode layer 10 may be, for example, impregnated in a liquid electrolyte. The liquid electrolyte may include a lithium salt, an ionic liquid, a polymeric ionic liquid, or a combination thereof. The liquid electrolyte may be non-volatile. The term "ionic liquid" refers to a salt in a liquid state at room temperature or a room temperature molten salt having a melting point of room temperature or less and comprises an ion. The ionic liquid may be a compound including a) a cation of an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof; and b) anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof. For example, the ionic liquid may be N-methyl-N-propyl pyrrolidinium bis(trifluoromethane-sulfonyl)imide, N-butyl-N-methyl pyrrolidinium bis(trifluoromethylsulfonyl)imide, 1-butyl-3-methylimidazolium bis(trifluoromethylsulfonyl)amide, 1-ethyl-3-methylimidazolium bis(trifluoromethylsulfonyl)amide, or a combination thereof. The polymeric ionic liquid may include a repeating unit that includes: a) a cation of an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and b) an anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof. The lithium salt may be any suitable lithium salt available in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), $LiCl$, $LiI$, or a combination thereof. The liquid electrolyte may include the lithium salt at a concentration in a range of about 0.1 molar (M) to about 5 M. A content of the liquid electrolyte impregnated in the positive electrode layer 10 may be in a range of about 0 part to about 100 parts by weight, about 0 part to about 50 parts by weight, about 0 part to about 30 parts by weight, about 0 part to about 10 parts by weight, or about 0.1 part to about 5 parts by weight, based on 100 parts by weight of the positive active material layer 12 not including a liquid electrolyte.

The all-solid secondary battery may be prepared by: providing a solid electrolyte layer; disposing a pre-first negative active material layer on a first surface of the solid electrolyte layer; heat treating the pre-first negative active material layer at a temperature of less than 600° C. to prepare a first negative active material layer; disposing a negative electrode current collector on the first negative active material layer; and disposing a positive active material layer on a second surface of the solid electrolyte layer to prepare the all-solid secondary battery.

The disposing of the pre-first negative active material layer on the first surface of the solid electrolyte layer may be performed by forming the pre-first negative active material layer on a substrate to thereby stack the pre-first negative active material layer on the solid electrolyte layer. As a method of forming the pre-first negative active material layer on the substrate, deposition such as sputtering, drop coating, spray coating, or solution infiltration may be used. Deposition may be performed, for example, by physical chemical vapor deposition.

The deposition may include sputtering, pulsed laser deposition (PLD), molecular beam epitaxy (MBE), ion plating, or ion beam deposition.

The deposition may include sputtering, for example, DC sputtering, radio frequency (RF) sputtering, magnetron sputtering, bias sputtering, or reactive sputtering. In an embodiment, RF sputtering may be used.

The substrate is not particularly limited, and various substrates, such as a support, a negative electrode, or a combination thereof, may be used depending on the manufacturing process.

The sputtering process conditions may include an RF power in a range of about 300 Watts (W) to about 500 W, a power density in a range of about 2.5 Watts per square centimeter ($W/cm^2$) to about 2.6 $W/cm^2$, a working pressure in a range of about 3 millitorr (mTorr) to about 9 mTorr, plasma gas, nitrogen, argon gas, or a combination thereof, may be used. A growth rate at which the pre-first negative active material layer is formed on the support may be controlled to about 0.3 angstrom per second (Å/sec) to 0.4 Å/sec. The distance between a sputter target and the substrate may be in a range of about 50 nm to about 120 mm, and the deposition time may be in a range of about 100 minutes to about 1,000 minutes.

When the sputtering process conditions are in the above-described ranges, a densified pre-first negative active material layer may be formed. When the sputtering process conditions are in the above-described ranges, a densified pre-first negative active material layer in an amorphous or a crystalline state may be formed.

After the sputtering process, heat treatment in a vacuum or inert gas atmosphere in a temperature range of greater than or equal to 200° C. and less than 600° C. may be further performed. After the heat treatment, thermal bonding of the solid electrolyte of the solid electrolyte layer and the pre-first negative active material of the pre-first negative active material layer is formed, and the following compound of Formula 1 may be formed:

$$(M1)_a(M2)_b(M3)_c(X)_d \hspace{2cm} \text{Formula 1}$$

wherein, in Formula 1, M1 may be a Group 1 element, Group 2 element, or a combination thereof, M2 may be Sc, V, Cr, Mn, Fe, Co, Ni, Cu, Zn, Ga, Al, Ge, Y, Zr, Hf, Nb, Tc, Rh, Cd, In, B, Si, P, F, Cl, Br, I, S, As, Re, Hg, Tl, Pb, or a combination thereof, and optionally C, N, or a combination thereof, M3 may be Ti, Nb, Sb, Bi, Ta, Mo, Ru, Pd, Ag, Sn, Se, Te, W, Os, Ir, Pt, Au, or a combination thereof, X may be O, N, P, or a combination thereof, and $0.1 \leq a \leq 1$, $0 < b \leq 3$, $0 < c \leq 2$, and $0.5 \leq d \leq 2$.

In the compound of Formula 1, M2, M3, and X may be, for example, from a composition of the sputter target. When X is, for example, oxygen (O), X may be from a sputter target and/or a result of sputtering.

The heat treatment may be, for example, performed at a temperature in a range of about 200° C. to about 300° C.

In particular, it is possible to form the first negative active material layer containing the compound of Formula 1, that is, a compound in an oxygen-deficient state, by carrying out the heat treatment in a vacuum or an inert gas atmosphere.

After the heat treatment, a concentration gradient of M1, M2, and M3 in the compound of Formula 1 may be formed in the first negative active material layer. However, when an all-solid secondary battery is manufactured by disposing a positive active material layer on the solid electrolyte layer on which the first negative active material layer is laminated, and when lithium moves by operating the battery, M1, M2, and M3 may be present uniformly in the compound of Formula 1.

As described above, when the first negative active material layer is formed, a lithium ion may move smoothly.

By disposing the first negative active material layer 22 on the solid electrolyte layer 30, short circuit of the all-solid secondary battery 1 may be suppressed, and cycle characteristics of the all-solid secondary battery 1 may be improved.

The second negative active material layer 23 may be further disposed on the first negative active material layer 22.

The all-solid secondary battery 1 may be, for example, manufactured by providing the solid electrolyte layer 30, sequentially stacking the first negative active material layer 22 and the second negative active material layer 23 on a first surface of the solid electrolyte layer 30, and stacking the positive electrode layer 10 on a second surface of the solid electrolyte layer 30.

Preparation of Solid Electrolyte Layer/Negative Electrode Layer

The first negative active material layer may be prepared by coating a metal alloy on a first surface of the solid electrolyte layer by a method such as a sputtering method, a vacuum deposition method, or a plating method. In an embodiment, the first negative active material layer may be prepared by placing a foil of a metal alloy on the first surface of the solid electrolyte layer and pressurizing it. The pressurizing may be, for example, roll pressing, flat pressing, warm isostatic pressing (WIP), or cold isotactic pressing (CIP), but is not necessarily limited thereto. Any suitable pressurization method available in the art may be used. The pressure applied during the pressurizing may be, for example, about 50 megapascals (MPa) to about 500 MPa. The time for the pressure to be applied may be in a range of about 5 milliseconds (ms) to about 10 minutes (min). The pressurizing may be performed, for example, at a temperature range from 25° C. to 90° C. After the pressurizing, heat treatment may be performed at a temperature of 200° C. or greater and less than 600° C.

The second negative active material layer may also be manufactured in the same manner as the first negative active material layer except that the second metal is used. A stack of solid electrolyte layer 30/negative electrode layer 20 may be prepared by placing a negative electrode current collector on the second negative active material layer and pressurizing it. The pressurizing may be performed by, for example, roll pressing, or flat pressing, but embodiments are not limited thereto. Any suitable pressurizing available in the art may be used. The pressure applied during the pressurizing may be, for example, about 50 MPa to about 500 MPa. The time for the pressure to be applied may be in a range of about 5 ms to about 10 min. The pressurizing may be performed at, for example, room temperature to a temperature less than 90° C., or at about 20° C. to about 90° C. In an embodiment, the pressurizing may be performed at a high temperature of 100° C. or greater.

In an embodiment, the second negative active material layer 23 may be manufactured using a second negative active material slurry.

For example, a material of the second negative active material layer 23, i.e., a second metal particle, or a binder, may be added to a polar or a nonpolar solvent to prepare a slurry. The prepared slurry may be applied on the first negative active material layer 22 of a first laminate of the prepared solid electrolyte layer 30/first negative active material layer 22, and the coated first laminate may be dried to prepare a second laminate.

Next, the negative electrode current collector 21 may be placed on the dried second laminate, and the negative electrode current collector 21/dried second laminate may be pressurized in the manner described above to prepare a laminate of the solid electrolyte layer 30/negative electrode layer 20.

Preparation of Positive Electrode Layer

First, a material, such as a positive active material, a binder, of the positive active material layer may be added to a nonpolar solvent to thereby prepare a slurry. The prepared slurry may be coated on the positive electrode current collector 11, followed by drying the coated positive electrode current collector. The resulting laminate may be pressurized to prepare a positive electrode layer 10. The pressurization may be performed by, for example, roll pressing, flat pressing, or pressing using hydrostatic pressure, but embodiments are not limited thereto. Any suitable pressurizing available in the art may be used. The pressurization may be omitted. A mixture of the material of the positive active material layer 12 may be compressed to mold the positive electrode layer 10 in a pellet shape or in a sheet shape. When the positive electrode layer 10 is prepared as above, the positive electrode current collector 11 may be omitted. In an embodiment, the positive electrode layer 10 may be impregnated in an electrolyte to be used.

Preparation of Solid Electrolyte Layer

The solid electrolyte layer 30 including an oxide-based solid electrolyte may be, for example, prepared by heat-treating a precursor of an oxide-based solid electrolyte material.

The oxide-based solid electrolyte may be prepared by contacting the precursor in a stoichiometric amount to form a mixture, and then heat-treating the mixture. The contacting may include milling or grinding, for example, ball milling. A mixture of precursors mixed with a stoichiometric composition may be subjected to a primary heat treatment in an oxidizing atmosphere to prepare a primary heat treated product. The primary heat treatment may be performed for about 1 hour to about 36 hours at a temperature less than 1,000° C. The primary heat treated product may be ground. The grinding of primary heat treated product may be carried out either in a dry method or in a wet method. The wet grinding may be, for example, performed by mixing a solvent such as methanol and the primary heat treated product, and then milling with a ball mill for about 0.5 hour to about 10 hours. The dry grinding may be performed by milling with a ball mill without a solvent. A diameter of the ground primary heat treated product may be in a range of about 0.1 μm to about 10 μm, or about 0.1 μm to about 5 μm. The ground primary heat treated product may be dried. The ground primary heat treated product may be mixed with a binder solution and molded into a pellet or simply pressed at a pressure in a range of about 1 ton to about 10 ton and molded into a pellet.

The molding may be subjected to a secondary heat treatment at a temperature of less than or equal to 1,000° C. for about 1 hour to about 36 hours. The sintered product, the solid electrolyte layer 30, may be obtained by the secondary heat treatment. The secondary heat treatment may be performed, for example, at a temperature of about 550° C. to about 1,000° C. To obtain a sintered product, the secondary heat treatment temperature is greater than the primary heat treatment temperature. For example, the secondary heat treatment temperature may be greater than the primary heat treatment temperature by 10° C. or greater, 20° C. or greater, 30° C. or greater, or 50° C. or greater. The molding may be subjected to the secondary heat treatment in an oxidizing atmosphere, a reducing atmosphere, or a combination thereof. The secondary heat treatment may be performed in a) an oxidizing atmosphere, b) a reducing atmosphere, or c) an oxidizing atmosphere and a reducing atmosphere.

The solid electrolyte layer 30 including a sulfide-based solid electrolyte may be prepared, for example, using a solid electrolyte comprising a sulfide-based solid electrolyte material.

With regard to the sulfide-based solid electrolyte, the starting material may be treated by, for example, a melt quenching method or a mechanical milling method, but embodiments are not necessarily limited thereto. Any suitable method available in the art as a method of preparing a sulfide-based solid electrolyte may be used. For example, when the melt quenching method is used, first, $Li_2S$, and $P_2S_5$ may be mixed in a given ratio, and the mixture is compressed into a pellet. The pellet may then be reacted at a given reaction temperature in vacuum and quenched to prepare a sulfide-based solid electrolyte material. In this regard, a reaction temperature of the mixture of $Li_2S$ and $P_2S_5$ may be in a range of about 400° C. to about 1,000° C., for example, in a range of about 800° C. to about 900° C. The reaction time may be, for example, about 0.1 hour to about 12 hours, or about 1 hour to about 12 hours. In addition, a temperature during the quenching of the reactant may be 10° C. or less, for example, 0° C. or less, and a quenching rate may be in a range of about 1 degree Celsius per second (° C./sec) to about 10,000° C./sec, for example, about 1° C./sec to about 1,000° C./sec. For example, when the mechanical milling method is used, a sulfide-based solid electrolyte material may be prepared by stirring and reacting a starting material such as $Li_2S$ and $P_2S_5$ using a ball mill. Although a stirring rate and duration of the mechanical milling method are not particularly limited, as the stirring rate increases, a rate of production of the sulfide-based solid electrolyte material may increase, and as the stirring duration increases, a conversion rate of raw materials into the sulfide-based solid electrolyte material may increase. Then, mixed raw materials prepared by the melt quenching method or the mechanical milling method may be thermally treated at a given temperature and ground to prepare the solid electrolyte in a particle form. In a case where the solid electrolyte has glass transition properties, the solid electrolyte may be crystalline due to heat treatment.

The thus produced solid electrolyte may be used to form the solid electrolyte layer 30 by any suitable known method for layer formation, such as deposition, aerosol deposition, cold spraying, or sputtering. In an embodiment, the solid electrolyte layer 30 may be prepared by pressurizing a solid electrolyte particle. In an embodiment, the solid electrolyte layer 30 may be prepared by mixing a solid electrolyte, a solvent, and a binder followed by coating, drying, and pressurizing.

Preparation of all-Solid Secondary Battery

The positive electrode layer 10 prepared as described above and the laminate of the negative electrode layer 20/solid electrolyte layer 30 may be stacked such that the solid electrolyte layer 30 may be placed between the positive electrode layer 10 and the negative electrode layer 20, followed by pressurization, to thereby manufacture the all-solid secondary battery 1.

For example, a second laminate may be prepared by placing the laminate of the negative electrode layer 20/solid electrolyte layer 30 on the positive electrode layer 10 such that the positive electrode layer 10 and the solid electrolyte layer 30 are in contact with each other, followed by pressurization of the second laminate, to thereby manufacture the all-solid secondary battery 10. The pressurizing may be performed by, for example, roll pressing, flat pressing, pressing using hydrostatic pressure, but embodiments are not limited thereto. Any suitable pressurizing available in the art may be used. The pressure applied during the pressurizing may be, for example, about 50 MPa to about 750 MPa. The time for the pressure to be applied may be in a range of about 5 ms to about 5 min. The pressurizing may be performed at, for example, room temperature to 90° C. or at about 20° C. to about 90° C. In an embodiment, the pressurizing may be performed at a high temperature of 100° C. or greater. The configuration and method of manufacturing the all-solid secondary battery 1 described above are example embodiments, and the elements and the manufacturing procedure may be appropriately changed. The pressurizing may be omitted.

Hereinafter the inventive concept will be described in detail with reference to Examples and Comparative Examples. These examples are for illustrative purposes only and are not intended to limit the scope of the inventive concept.

EXAMPLES

Example 1: NCA (5.1 Milliampere-Hours Per Square Centimeter ($mAh/cm^2$))/LLZO Pellet (500 μm)/LiGeTeO (20 nm)/Carbon (7 μm)/Li (20 μm)

As a solid electrolyte layer, a $LLZO(Li_7La_3Zr_2O_{12})$ pellet having a thickness of 500 μm was prepared.

RF sputtering was performed on the LLZO pellet using a GeTe target to form a GeTe alloy film having a thickness of about 20 nm, thus forming a metal alloy layer to thereby prepare a LLZO solid electrolyte layer/pre-first negative active material layer structure. The atomic ratio (molar ratio) of Ge and Te in the GeTe alloy film was 2:1. The process conditions for GeTe alloy film sputtering were, a power of 200 W, a sputtering time of 1,800 seconds, and a plasma gas of $N_2$ (8 mTorr).

The LLZO solid electrolyte layer/pre-first negative active material layer structure was heat-treated in an argon atmosphere at about 200° C. Then, annealing was performed for 30 minutes at a temperature of 200° C. to prepare a LLZO solid electrolyte layer/first negative active material layer (having a thickness of 20 nm) structure. The first negative active material layer contained $Li_1Ge_{0.79}Te_{0.53}O_{1.81}$.

In addition, a second negative active material layer slurry was bar-coated on an SUS foil and the coated SUS foil was dried for 1 hour at room temperature (25° C.) to thereby form a second negative active material layer (C layer) (having a thickness of about 7 µm) on the SUS foil.

The second negative active material layer slurry was prepared according to the following procedure.

3 g of carbon black (CB) as a negative active material was added to a vessel. A mixture of 2.692 g of a PVA-PAA binder solution (SUMITOMO SEIKA CHEMICALS CO., LTD, AG binder) and 7 g of distilled water was added thereto, followed by primary stirring at 1,000 rpm for 30 minutes, thereby preparing a first slurry. 4 g of zirconia balls and 20 g of distilled water were added to the first slurry, and a second slurry was prepared by secondary stirring at 1,000 rpm for 30 minutes. 20 g of distilled water were added to the second slurry, and a third slurry was prepared by secondary stirring at 1,000 rpm for 30 minutes.

The second negative active material layer (C layer) was placed on the first negative active material layer of the first negative active material layer (metal alloy layer)/LLZO film structure. The SUS foil was removed from second negative active material layer. A lithium metal foil (having a thickness of 20 µm) and a copper foil, i.e., a negative electrode current collector, were pressurized with 250 MPa on the second negative active material layer (C layer) by cold isotactic pressing (CIP) at a temperature of 25° C. to thereby manufacture a solid electrolyte layer/first negative active material layer/second negative active material layer/lithium metal/copper thin film laminate.

$LiNi_{0.8}Co_{0.15}Al_{0.05}O_2$ (NCA) was prepared as a positive active material. In addition, polytetrafluoroethylene (Du-Pont™ Teflon binder) was prepared as a binder. Carbon nanofibers (CNF) was prepared as a conductive agent. Then, these materials were mixed in a weight ratio of positive active material:conductive agent:binder=100:2:1. The mixture was stretched in a form of a sheet to produce a positive active material sheet. By pressing the positive active material sheet on a positive electrode current collector comprising an aluminum foil having a thickness of 18 µm, a positive electrode layer was prepared.

The positive active material layer of the prepared positive electrode layer was impregnated in an electrolytic solution obtained by dissolving 2.0 M of LiFSI in an ionic liquid of N-propyl-N-methyl-pyrrolidinium bis(fluorosulfonyl)imide (PYR13FSI). LiFSI represents lithium bis(fluorosulfonyl) imide).

The positive electrode layer was placed such that the positive active material layer impregnated in the electrolytic solution in the SUS cap faced the top. An all-solid secondary battery was manufactured by placing a laminate of solid electrolyte layer/negative electrode layer such that the solid electrolyte layer was disposed on the positive active material layer and sealing the structure. The positive electrode layer and the negative electrode layer were insulated with an insulator. A part of the positive electrode current collector and a part of the negative electrode current collector were protruded to the outside of the sealed battery and used as a positive electrode layer terminal and a negative electrode layer terminal, respectively.

Example 2

An all-solid secondary battery was prepared in the same manner as in Example 1, except that the LLZO solid electrolyte layer/pre-first negative active material layer structure underwent heat treatment at a heat treatment temperature (T) and heat treatment atmosphere as shown in Table 1 to prepare the LLZO solid electrolyte layer/first negative active material layer structure.

Examples 3 and 4

An all-solid secondary battery was prepared in the same manner as in Example 1, except that the LLZO solid electrolyte layer/pre-first negative active material layer structure underwent heat treatment at a heat treatment temperature (T) and heat treatment atmosphere as shown in Table 1 to prepare the LLZO solid electrolyte layer/first negative active material layer structure, and $LiNi_{0.8}Co_{0.15}Mn_{0.05}O_2$ (NCM) was used instead of $LiNi_{0.8}Co_{0.15}Al_{0.05}O_2$(NCA) as a positive active material to prepare the positive active material layer.

Example 5

A metal alloy layer was prepared by forming a CuTe alloy film to a thickness of about 20 nm by RF sputtering using a CuTe target on the LLZO pellet. Here, the atomic ratio (molar ratio) of Cu and Te in the CuTe alloy film was 2:1.

An all-solid secondary battery was prepared in the same manner as in Example 1, except that the LLZO solid electrolyte layer/pre-first negative active material layer structure underwent heat treatment at a heat treatment temperature (T) and heat treatment atmosphere as shown in Table 1 to prepare the LLZO solid electrolyte layer/first negative active material layer structure.

Example 6: NCA (5.1 mAh/cm²)/LLZO Pellet (500 µm)/GeTe (20 nm)/AgC (7 µm)/Li (20 µm)

A second negative active material layer (AgC layer) (having a thickness of about 7 µm) was formed on an SUS foil in the same manner as in Example 1, except that the second negative active material layer slurry obtained as follows was used as a second negative active material layer slurry.

As a negative active material, carbon black (CB) having a primary diameter of 38 nm and silver (Ag) particle having an average particle diameter of about 100 nm were prepared.

3 g of carbon black (CB) and 1 g of silver particle were added to a vessel. A mixture of 2.692 g of a PVA-PAA binder solution (SUMITOMO SEIKA CHEMICALS CO., LTD, AG binder) and 7 g of distilled water was added thereto, followed by primary stirring at 1,000 rpm for 30 minutes, thereby preparing a first slurry. 4 g of zirconia balls and 20 g of distilled water were added to the first slurry, and a second slurry was prepared by secondary stirring at 1,000 rpm for 30 minutes. 20 g of distilled water were added to the second slurry, and a third slurry was prepared by secondary stirring at 1,000 rpm for 30 minutes.

Examples 7 to 9

All-solid secondary batteries were prepared in the same manner as in Example 1, except that the thickness of the first negative active material layer were 2 nm, 50 nm, and 100 nm, respectively, instead of 20 nm.

Examples 10 and 11

All-solid secondary batteries were prepared in the same manner as in Example 1, except that RF sputtering was performed using a SbTe target and a SnTe target, respectively, instead of the GeTe target.

Comparative Example 1

An all-solid secondary battery was prepared in the same manner as in Example 1, except that the LLZO solid electrolyte layer/pre-first negative active material layer structure did not undergo heat treatment to prepare the LLZO solid electrolyte layer/first negative active material layer structure.

Comparative Example 1A

An all-solid secondary battery was prepared in the same manner as in Example 1, except that $LiNi_{0.8}Co_{0.15}Mn_{0.05}O_2$ (NCM) was used instead of $LiNi_{0.8}Co_{0.15}Al_{0.05}O_2$ (NCA) as a positive active material to prepare a positive active material layer.

Comparative Example 2

An all-solid secondary battery was prepared in the same manner as in Example 1, except that the LLZO solid electrolyte layer/pre-first negative active material layer structure underwent heat treatment at a heat treatment temperature (T) and heat treatment atmosphere as shown in Table 1 to prepare the LLZO solid electrolyte layer/first negative active material layer structure, and $LiNi_{0.8}Co_{0.15}Mn_{0.05}O_2$ (NCM) was used instead of $LiNi_{0.8}Co_{0.15}Al_{0.05}O_2$(NCA) as a positive active material to prepare the positive active material layer.

Comparative Example 3

An all-solid secondary battery was prepared in the same manner as in Example 1, except that the LLZO solid electrolyte layer/pre-first negative active material layer structure underwent heat treatment at a heat treatment temperature (T) and heat treatment atmosphere as shown in Table 1 to prepare the LLZO solid electrolyte layer/first negative active material layer structure.

TABLE 1

| | Heat treatment | | Composition of first |
|---|---|---|---|
| Classification | Heat treatment temperature (T)(° C.) | Heat treatment atmosphere | negative active material in first negative active material layer |
| Example 1 | 200 | Argon | $Li_1Ge_{0.79}Te_{0.53}O_{1.81}$ |
| Example 2 | 200 | Vacuum | $Li_1Ge_{1.25}Te_{1.39}O_{1.39}$ |
| Example 3 | 300 | Argon | $Li_1Ge_{1.07}Te_{0.83}O_{0.73}$ |
| Example 4 | 300 | Vacuum | $Li_1Ge_{0.55}Te_{0.45}O_{0.57}$ |
| Example 5 | 300 | Vacuum | $Li_1Cu_{2.34}Te_{1.44}O_{0.76}$ |
| Comparative Example 1 | NA | NA | $Li_1Ge_{2.25}Te_{4.77}O_{10.91}$ |
| Comparative Example 2 | 200 | Air | $Li_1Ge_{0.53}Te_{1.22}O_{4.05}$ |
| Comparative Example 3 | 600 | Vacuum | $Li_1Ge_{0.05}Te_{0.02}O_{0.92}$ |

Evaluation Example 1: Interfacial Resistance

Figure 3:
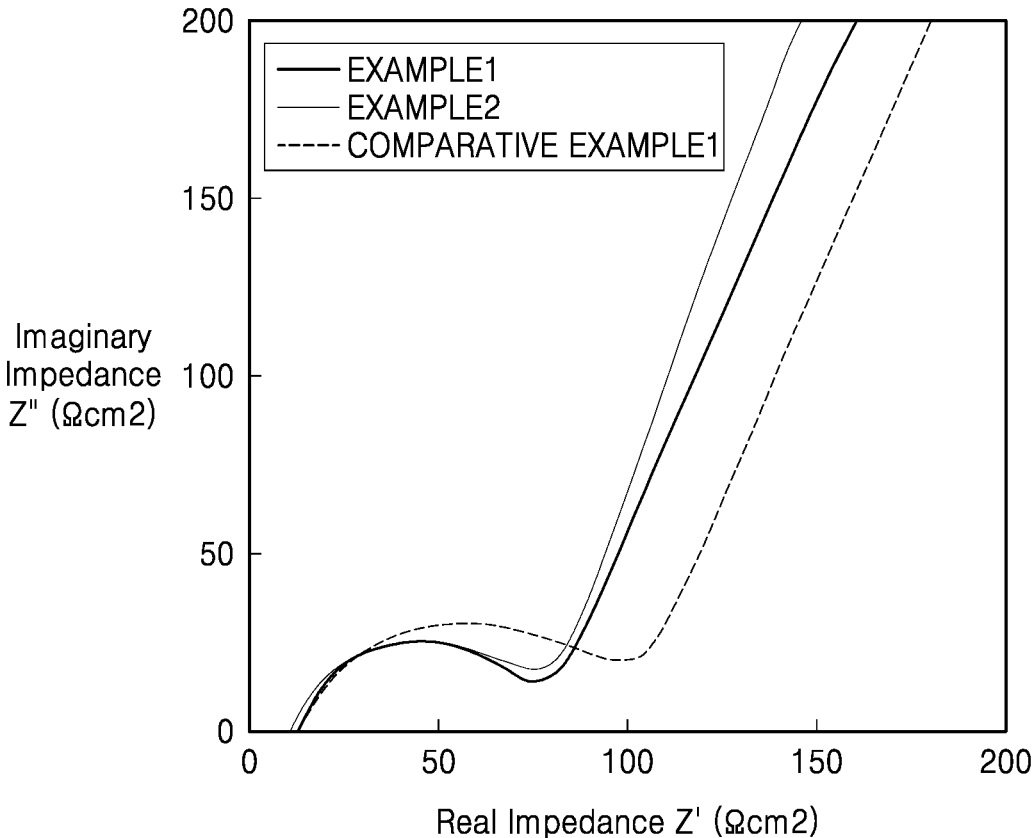
FIG. 3 is a graph of imaginary impedance (Z", ohms-square centimeter, $\Omega \cdot cm^2$) vs. real impedance (Z', $\Omega \cdot cm^2$) that shows a Nyquist plot showing results of impedance measurement of all-solid secondary batteries prepared in Examples 1 and 2 and Comparative Example 1.

The overall resistance of each of the all-solid secondary batteries manufactured in Examples 1 and 2 and Comparative Example 1 were measured. The impedance of each of the all-solid secondary batteries of Examples 1 and 2 and Comparative Example 1 was measured using an impedance analyzer (Solartron 1400A/1455A Impedance Analyzer) according to the 2-probe method. The frequency range was 0.1 Hertz (Hz) to 1 MegaHertz (MHz), and the amplitude voltage was 10 millivolts (mV). The measurement was performed in an air atmosphere at a temperature of 25° C. FIG. 3 shows a Nyquist plot illustrating results of impedance measurement.

As a result of fitting the Nyquist plot of FIG. 3 to an equivalent circuit, the interfacial resistance of the all-solid secondary battery of Comparative Example 1 was about 85 ohms-square centimeter (0 $cm^2$). The interfacial resistance of each of the all-solid secondary batteries of Examples 1 and Example 2 was about 50 $\Omega cm^2$ and 60 $\Omega cm^2$, respectively.

Also, as shown in FIG. 3, the ohmic resistances of the all-solid secondary batteries of Examples 1 and 2 also reduced, as compared with the all-solid secondary battery of Comparative Example 1.

Therefore, it was found that the total resistance of the sum of the interfacial resistance and the ohmic resistance of the all-solid secondary batteries of Examples 1 and 2 decreased, as compared with the all-solid secondary battery of Comparative Example 1.

Evaluation Example 2: Charge/Discharge Test (I) at Room Temperature

Charge/discharge characteristics of the all-solid secondary batteries of Examples 1 and 2 and Comparative Example 1A were evaluated by the following charge/discharge test. The charge/discharge evaluation of the all-solid secondary batteries was performed in a thermostatic bath at a temperature of 25° C.

Then, the battery was discharged with a constant current of 0.5 $mA/cm^2$ until the voltage reached 4.2 V. Subsequently, the battery was discharged with a constant current of 0.5 $mA/cm^2$ until the battery voltage reached 2.85 V.

In the second cycle, the battery was charged with a constant current of 1.0 $mA/cm^2$ until the voltage reached 4.2 V. Subsequently, the battery was discharged with a constant current of 1.0 $mA/cm^2$ until the battery voltage reached 2.85 V.

In the third cycle, the battery was charged with a constant current of 1.0 $mA/cm^2$ until the voltage reached 4.2 V. Subsequently, the battery was discharged with a constant current of 1.0 $mA/cm^2$ until the battery voltage reached 2.85 V.

Figure 4:
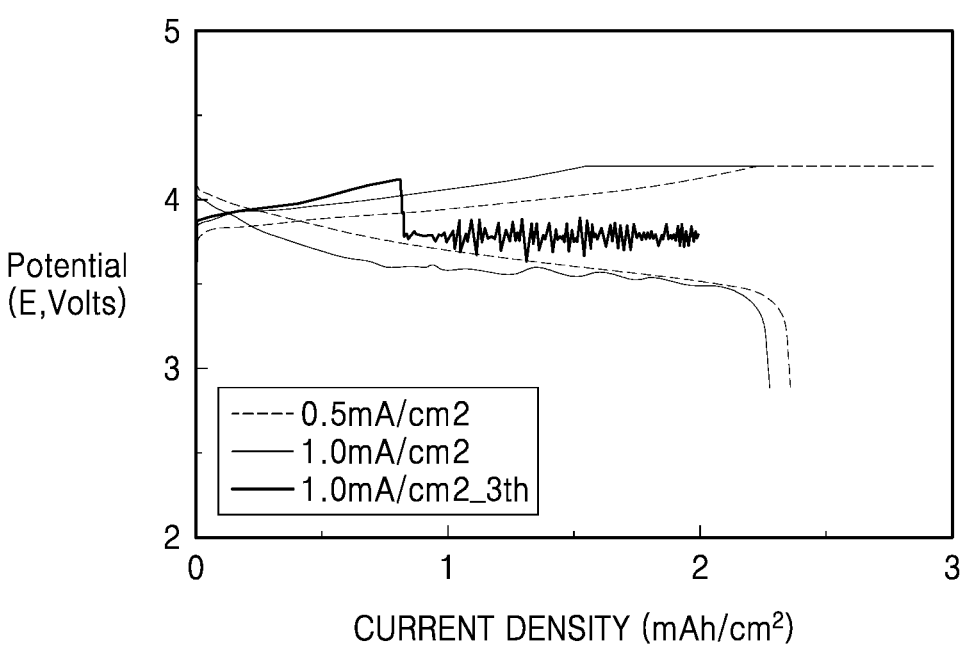
FIG. 4 is a graph of potential (E, Volts vs. $Li^+/Li$) vs. current density ($mAh/cm^2$) and shows charging and discharging characteristics of an all-solid secondary battery of Comparative Example 1A at room temperature.

The partial results of charging and discharging are shown in FIG. 4.

Charge/discharge characteristics of the all-solid secondary batteries of Examples 1 and 2 and Comparative Example 1A were evaluated by the following charge/discharge test. The charge/discharge evaluation of the all-solid secondary batteries was performed in a thermostatic bath at a temperature of 25° C.

Then, in the first to third cycles, the battery was discharged with a constant current of 0.5 $mA/cm^2$ until the voltage reached 4.2 V. Subsequently, the battery was discharged with a constant current of 0.5 mA/cm² until the battery voltage reached 2.85 V.

In the fourth to sixth cycles, the battery was charged with a constant current of 1.0 mA/cm² until the voltage reached 4.2 V. Subsequently, the battery was discharged with a constant current of 1.0 mA/cm² until the battery voltage reached 2.85 V.

In the seventh to ninth cycles, the battery was charged with a constant current of 2.0 mA/cm² until the voltage reached 4.2 V. Subsequently, the battery was discharged with a constant current of 2.0 mA/cm² until the battery voltage reached 2.85 V.

In the tenth to eleventh_cycles, the battery was charged with a constant current of 3.0 mA/cm² until the voltage reached 4.2 V. Subsequently, the battery was discharged with a constant current of 3.0 mA/cm² until the battery voltage reached 2.85 V.

In the twelfth to fourteenth cycles, the battery was charged with a constant current of 0.5 mA/cm² until the voltage reached 4.2 V. Subsequently, the battery was discharged with a constant current of 0.5 mA/cm² until the battery voltage reached 2.85 V.

Figure 5:
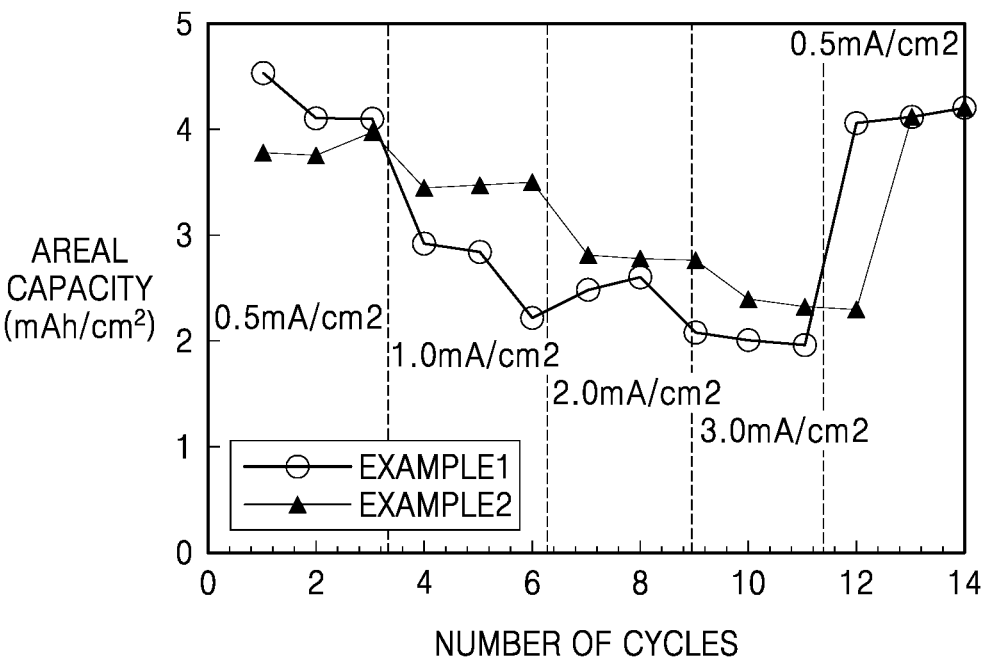
FIG. 5 is a graph of areal capacity ($mAh/cm^2$) vs. number of cycles and shows charging and discharging characteristics of all-solid secondary batteries of Examples 1 and 2 at room temperature.

The partial results of charging and discharging are shown in FIG. 5.

As shown in FIG. 5, the all-solid secondary batteries of Examples 1 and 2 underwent charging and discharging until the 14th cycle without a short circuit occurred, and the capacity retention was excellent at a current density of 3.0 mA/cm². These results showed that an all-solid secondary battery with improved short circuit prevention and high rate characteristics was manufactured by thermal bonding of the solid electrolyte layer and the first negative active material layer.

In contrast, the all-solid secondary battery of Comparative Example 1A, as shown in FIG. 4, a short circuit occurred in the 3rd cycle, and the high-rate characteristic thereof was poorer than that of the all-solid secondary batteries of Examples 1 and 2.

Evaluation Example 3: Charge/Discharge Test (II) at Room Temperature

Charge/discharge characteristics of the all-solid secondary batteries of Examples 3 and 4 and Comparative Example 2 were evaluated by the following charge/discharge test. The charge/discharge evaluation of the all-solid secondary batteries was performed in a thermostatic bath at a temperature of 25° C.

Then, in first to third cycles, the battery was discharged with a constant current of 0.5 mA/cm² until the voltage reached 4.2 V. Subsequently, the battery was discharged with a constant current of 0.5 mA/cm² until the battery voltage reached 2.85 V.

In the fourth to fifth cycles, the battery was charged with a constant current of 1.0 mA/cm² until the voltage reached 4.2 V. Subsequently, the battery was discharged with a constant current of 1.0 mA/cm² until the battery voltage reached 2.85 V.

In the sixth to tenth cycles, the battery was charged with a constant current of 1.5 mA/cm² until the voltage reached 4.2 V. Subsequently, the battery was discharged with a constant current of 1.5 mA/cm² until the battery voltage reached 2.85 V.

Figure 6:
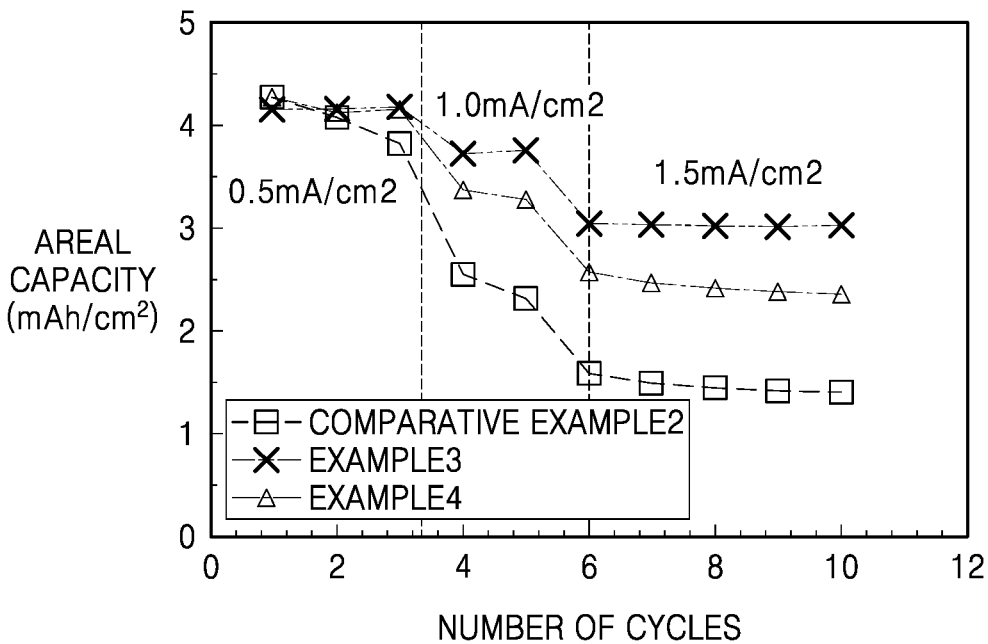
FIG. 6 is a graph of areal capacity (mAh/cm$^2$) vs. number of cycles and shows charging and discharging characteristics of all-solid secondary batteries of Examples 3 and 4 and Comparative Example 2 at room temperature.

The partial results of charging and discharging are shown in FIG. 6.

As shown in FIG. 6, the all-solid secondary batteries of Examples 3 and 4 underwent charging and discharging until the 10th cycle without a short circuit, and the capacity retention was excellent in at a current density of 1.5 mA/cm².

In contrast, in the all-solid secondary battery of Comparative Example 2, as shown in FIG. 6, charging and discharging characteristics were deteriorated, as compared with those of Examples 3 and 4. In view of this result, it may be seen that the charging and discharging characteristics are further improved when heat treatment is performed under argon or vacuum atmosphere as in Examples 3 and 4, as compared with a case where heat treatment is performed in air atmosphere to form the first negative active material layer formed on the solid electrolyte layer.

Evaluation Example 4: X-Ray Photoelectron Spectroscopy (XPS) Evaluation

Photoelectron spectroscopy of the first negative active material layer of the all-solid secondary batteries of Examples 1 to 5 and Comparative Examples 1 to 3 was performed using the THERMO K-Alpha XPS system, with a spot size of 400 μm and a resolution of 0.1 electronvolts (eV).

The results of XPS analysis on Li1s, Ge2p3, Te3d5, and O1s were investigated to determine the ratio of each element contained in each first negative active material layer. The results thereof are shown in Table 2 and Table 3.

Table 2 shows the results of XPS analysis Li1s, Ge2p3, Te3d5, and O1s of the compound of Formula 1 at the intermediate thickness region of the first negative active material layer (a point about 10 nm from the surface region of the first negative active material layer adjacent to the negative electrode current collector), while measuring at an average depth of 0.1 nm per sputter second in the XPS analysis on the first negative active material layer. Table 3 shows the results of XPS analysis Li1s, Cu2p3, Te3d5, and O1s of the compound of Formula 1 at the intermediate thickness region of the first negative active material layer (a point about 10 nm from the surface region of the first negative active material layer adjacent to the negative electrode current collector), while measuring at an average depth of 0.1 nm per sputter second in the XPS analysis on the first negative active material layer.

The XPS analysis results in Table 2 and Table 3 were converted and evaluated through element confirmation for the support (Si wafer or Cu foil). Here, for element confirmation for the support (Si wafer or Cu foil), the sample was prepared by forming the first negative active material layer on the support without the LLZO layer, and then the XPS analysis result for the sample was set as a reference.

TABLE 2

| | Heat treatment | | XPS analysis (atom %) | | | | atomic ratio | | |
| | Heat treatment temperature (° C.) | Heat treatment Atmosphere | Li1s | Ge2p3 | Te3d5 | O1s | $M_2M_3X/$ $M_1M_2M_3X$ | $M_2M_3X/$ $M_1$ | $M_1M_2M_3/$ X |
|---|---|---|---|---|---|---|---|---|---|
| Example 1 | 200 | Argon | 12.6 | 9.95 | 6.67 | 22.8 | 0.758 | 3.129 | 1.282 |
| Example 2 | 200 | Vacuum | 12.1 | 15.1 | 16.8 | 16.8 | 0.801 | 4.028 | 2.621 |
| Example 3 | 300 | Argon | 19.3 | 31.4 | 24.2 | 21.5 | 0.800 | 3995 | 3.484 |
| Example 4 | 300 | Vacuum | 26.5 | 14.6 | 11.9 | 15.1 | 0.611 | 1.569 | 3.508 |
| Comparative Example 1 | NA | NA | 3.42 | 7.7 | 16.3 | 37.3 | 0.947 | 17.924 | 0.735 |
| Comparative Example 2 | 200 | Air | 12.5 | 6.66 | 15.3 | 50.6 | 0.853 | 5.805 | 0.681 |
| Comparative Example 3 | 600 | Vacuum | 38.0 | 1.79 | 0.63 | 17.3 | 0.342 | 0.519 | 2.336 |

TABLE 3

| | Heat treatment | | XPS analysis (atom %) | | | | atomic ratio | | |
| | Heat treatment temperature (° C.) | Heat treatment Atmosphere | Li1s | Cu2p3 | Te3d5 | O1s | M2M3X/ M1M2M3X | M2M3X/ M1 | M1M2M3/ X |
|---|---|---|---|---|---|---|---|---|---|
| Example 5 | 300 | Vacuum | 15.1 | 42.9 | 26.3 | 13.9 | 0.846 | 5.503 | 6.065 |

As shown in Table 2 and Table 3, in the compound of Formula 1 in the negative electrode layers of Examples 1 to 5, the atomic ratio of M2M3X/M1M2M3X was from 0.611 to 0.820, the atomic ratio of M2M3X/M1 was from 1.569 to 4.541, the atomic ratio of M1M2M3/X was from 1.282 to 6.295. However, in the compound of Formula 1 in the negative electrode layers of Comparative Examples 1 to 3, the atomic ratio of M2M3X/M1M2M3X was out of 0.5 to 0.85. Further, the atomic ratio of M2M3X/M1 was out of 1.0 or greater and 5.51 or less, and the atomic ratio (M1M2M3/X) of M1M2M3 to X ion was out of 1.2 or greater.

As described above, when the pre-first negative active material layer is heat-treated at a temperature from about 200° C. to about 300° C. in vacuum or argon atmosphere (Examples 1 to 4), a first negative active material layer having a desired ratio of elements may be formed, and, depending on the heat treatment conditions, lithium diffusion and composition of the first negative active material layer may change.

When heat treatment is not performed when forming the first negative active material layer as in Comparative Example 1, when the pre-first negative active material layer is heat-treated at a temperature of 200° C. in an air atmosphere as in Comparative Example 2, and when the pre-first negative active material layer is heat-treated at a temperature of 600° C. in vacuum atmosphere as in Comparative Example 3, it was found that it is difficult to form a first negative active material layer having a desired ratio of elements. In light of this, it was found that temperature and atmosphere are very important during heat treatment, and in particular, a first negative active material layer containing an oxygen-deficient compound may be formed when heat treatment is carried out in a vacuum or inert gas atmosphere.

As apparent from the foregoing description, a reinforced all-solid secondary battery may be manufactured where a lithium-metal alloy path may be secured, the interfacial resistance may be reduced by coating and heat treating the multi-component metal layer on a surface of the solid electrolyte layer to strengthen the thermal bonding between the solid electrolyte layer and the negative electrode layer, and bonding force may be enhanced.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:

a positive electrode layer comprising a positive active material;

a negative electrode layer comprising a negative electrode current collector and a first negative active material layer; and a solid electrolyte layer between the positive electrode layer and the negative electrode layer, the solid electrolyte layer comprising a solid electrolyte, wherein the first negative active material layer is adjacent to the solid electrolyte layer, and the first negative active material layer comprises a multi-component metal composite comprises at least one compound represented by Formula 1:

$$(M1)_a(M2)_b(M3)_c(X)_d \qquad \text{Formula 1}$$

wherein, in Formula 1;

an atomic ratio of (b+c+d):(a+b+c+d) in the multi-component metal composite is in a range of about 0.5:1 to about 0.85:1, and an atomic ratio of (b+c+d): a is in a range of about 1:1 to about 5.51:1, M1 is a Group 1 element, Group 2 element, or a combination thereof, M2 is an element of Sc, Cr, Mn, Fe, Co, Ni, Cu, Zn, Ga, Al, Ge, Y, Zr, Hf, Rh, Cd, In, B, Si, P, F, Cl, Br, I, S, As, Re, Hg, Tl, Pb, or a combination thereof, and optionally C, N, or a combination thereof, M3 is an element of Ti, Nb, Sb, Bi, Ta, Mo, Ru, Pd, Ag, Sn, Se, Te, W, Os, Ir, Pt, Au, or a combination thereof, and X is O, N, P, or a combination thereof, and $0.1 \le a \le 1.0 < b \le 3$, $0 < c \le 2$, and $0.5 \le d \le 2$.

2. The all-solid secondary battery of claim 1, wherein the at least one compound of Formula 1, M1 is Li, M2 is Ge, Ga, Cu, or a combination thereof, M3 is Te, Nb, Sb, Bi, Ta, Se, or a combination thereof.

3. The all-solid secondary battery of claim 1, wherein the first negative active material layer is a compact layer without pores.

4. The all-solid secondary battery of claim 1, wherein an atomic ratio of M1M2M3 to X ion in the multi-component metal composite is about 1.2:1 or greater.

5. The all-solid secondary battery of claim 1, wherein the at least one compound of Formula 1 comprises $Li_aGe_bTecOd$, $Li_aCu_bTe_cO_d$, $Li_aSb_bTe_cO_d$, $Li_aGe_bSe_cO_d$, $Li_aGa_bTe_c O_d$, $Li_aZn_bTe_cO_d$, $Li_aBi_bTe_cO_d$, $Li_aAu_bTe_cO_d$, wherein $0<b\le2$, $0<c<1$, $Li_aAs_bTe_cO_d$, $Li_aSn_bTe_cO_d$, wherein $0<b\le1$, $0<c\le1$, $Li_aSr_bTe_cO_d$, wherein $0<b\le1$, $0<c\le1$, $Li_aY_bTe_cO_d$, $Li_aZr_bTe_cO_d$, wherein $0<c\le1$, —$Li_aNb_bTe_cO_d$, $0<b\le2$, $0<c\le1$, $Li_aMo_bTe_cO_d$, wherein $0<b\le2$, $0<c\le1$, $Li_aAg_bTe_cO_d$, wherein, $Li_aIn_bTe_cO_d$, —$Li_aPd_bTe_cO_d$, wherein $0<b\le2$, $0<c\le1$, or a combination thereof.

6. The all-solid secondary battery of claim 1, wherein the at least one compound of Formula 1 comprises a compound of Formula 2 or a compound of Formula 3:

$$Li_aGe_bTe_cO_d \qquad \text{Formula 2}$$

wherein, in Formula 2, $0<b\le2$, and $$Li_aCu_bTe_cO_d \qquad \text{Formula 3}$$

wherein, in Formula 3.

7. The all-solid secondary battery of claim 1, wherein the at least one compound of Formula 1 is $Li_1Ge_{0.79}Te_{0.53}O_{1.81}$, $Li_1Ge_{1.25}Te_{1.39}O_{1.39}$, $Li_1Ge_{1.07}Te_{0.83}O_{0.73}$, $Li_1Ge_{0.55}Te_{0.45}O_{0.57}$, $Li_1Cu_{2.34}Te_{1.44}O_{0.76}$, or a combination thereof.

8. The all-solid secondary battery of claim 1, further comprising a second negative active material layer between the negative electrode current collector and the first negative active material layer, wherein a second negative active material of the second negative active material layer comprises a carbonaceous negative active material, and optionally a metal or a metalloid negative active material.

9. The all-solid secondary battery of claim 8, wherein the carbonaceous negative active material is in a form of a particle, and an average diameter of the carbonaceous negative active material particle is about 4 micrometers or less.

10. The all-solid secondary battery of claim 8, wherein the carbonaceous negative active material comprises amorphous carbon, and if present, the metal or the metalloid negative active material comprises indium, silicon, gallium, tin, aluminum, titanium, zirconium, niobium, germanium, antimony, bismuth, gold, platinum, palladium, magnesium, palladium, silver, zinc, or a combination thereof.

11. The all-solid secondary battery of claim 8, wherein the metal or the metalloid negative active material is present, and the second negative active material layer comprises: a composite of a first particle comprising amorphous carbon and a second particle comprising the metal or the metalloid, wherein a content of the second particle is in a range of about 1 weight percent to about 60 weight percent, based on a total weight of the composite; or a mixture of the first particle comprising amorphous carbon and the second particle comprising the metal or the metalloid, and wherein a content of the second particle is in a range of about 1 weight percent to about 60 weight percent, based on a total weight of the mixture.

12. The all-solid secondary battery of claim 8, further comprising a metal layer comprising lithium or lithium alloy disposed between the negative electrode current collector and the second negative active material layer, or between the second negative active material layer and the first negative active material layer.

13. The all-solid secondary battery of claim 8, wherein a region between the negative electrode current collector and the first negative active material layer is a lithium metal-free region that does not comprise lithium metal.

14. The all-solid secondary battery of claim 1, further comprising a metal layer comprising lithium or lithium alloy between the negative electrode current collector and the first negative active material layer.

15. The all-solid secondary battery of claim 1, wherein a reduction potential of a lithium ion in the first negative active material layer is greater than a reduction potential of the solid electrolyte.

16. The all-solid secondary battery of claim 1, wherein the solid electrolyte is an oxide solid electrolyte, a sulfide solid electrolyte, or a combination thereof, and the oxide solid electrolyte is at least one of $Li_{1+x+y}Al_xTi_{2-x}Si_yP_{3-y}O_{12}$, wherein $0<x<2$ and $0\le y<3$, $BaTiO_3$, $Pb(Zr_pTi_{1-p})O_3$, wherein $0\le p\le1$, $Pb_{1-x}La_xZr_{1-y}Ti_yO_3$, wherein $0\le x<1$ and $0\le y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$, wherein $0<x<2$ and $0<y<3$, $Li_xAl_yTi_z(PO_4)_3$, wherein $0<x<2$, $0<y<1$, and $0<z<3$, $Li_{1+x+y}(Al_pGa_{1-p})_x$ $(Ti_qGe_{1-q})_{2-x}Si_yP_{3-y}O_{12}$, wherein $0\le x\le1$, $0\le y\le1$, $0 \leq p \leq 1$, and $0 \leq q \leq 1$, $Li_xLa_yTiO_3$, wherein $0 < x < 2$ and $0 < y < 3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$, wherein M is Te, Nb, or Zr, and x is an integer from 1 to 10, and the sulfide solid electrolyte is at least one of $Li_2S$—$P_2S_5$, $Li_2S$—$P_2S_5$—LiX, wherein X is a halogen, $Li_2S$—$P_2S_5$—$Li_2O$, $Li_2S$-$P_2S_5$-$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are positive integers and Z is Ge, Zn, Ga, or a combination thereof, $Li_2S$—$GeS_2$, $Li_2S$—$SiS_2$—$Li_3PO_4$, and $Li_2S$—$SiS_2$-$Li_pMO_q$, wherein p and q are positive integers and M is P, Si, Ge, B, Al, Ga, In, or a combination thereof, $Li_{7-x}PS_{6-x}Cl_x$, wherein $0 < x < 2$, $Li_{7-x}PS_{6-x}Br_x$, wherein $0 < x < 2$, $Li_{7-x}PS_{6-x}I_x$, wherein $0 < x < 2$.

17. A method of preparing the all-solid secondary battery of claim 1, the method comprising:

providing a solid electrolyte layer;

disposing a pre-first negative active material layer on a first surface of the solid electrolyte layer;

heat-treating the pre-first negative active material layer at a temperature of less than about 600° C. to prepare a first negative active material layer;

disposing a negative electrode current collector on the first negative active material layer; and disposing a positive active material layer on a second surface of the solid electrolyte layer to prepare the all-solid secondary battery.

18. The method of claim 17, wherein before the disposing of the negative electrode current collector on the first negative active material layer, a second negative active material layer is formed on the first negative active material layer, and then the negative electrode current collector is disposed on the second negative active material layer.

19. The method of claim 18, wherein the second negative active material layer comprises a composite of a first particle comprising amorphous carbon and a second particle comprising a metal or a metalloid, wherein a content of the second particle is in a range of about 1 weight percent to about 60 weight percent, based on a total weight of the composite, or a mixture of the first particle comprising amorphous carbon and the second particle comprising the metal or the metalloid, and wherein a content of the second particle is in a range of about 1 weight percent to about 60 weight percent, based on a total weight of the mixture.

20. An all-solid secondary battery comprising:

a positive electrode layer comprising a positive active material;

a negative electrode layer comprising a negative electrode current collector, a first negative active material layer, and a metal layer comprising lithium or lithium alloy between the negative electrode current collector and the first negative active material layer;

a solid electrolyte layer between the positive electrode layer and the negative electrode layer, the solid electrolyte layer comprising a solid electrolyte, wherein the first negative active material layer is adjacent to the solid electrolyte layer, the first negative active material layer comprises a multi-component metal composite comprising M1, M2, M3, and X, an atomic ratio of M2M3X to M1M2M3X in the multi-component metal composite is in a range of about 0.5:1 to about 0.85:1, an atomic ratio of M2M3X to M1 ion is in a range of about 1:1 to about 5.51:1, and an atomic ratio of M1M2M3 to X ion in the multi-component metal composite is about 1.2:1 or greater, wherein M1 is a Group 1 element, Group 2 element, or a combination thereof, M2 is Sc, V, Cr, Mn, Fe, Co, Ni, Cu, Zn, Ga, Al, Ge, Y, Zr, Hf, Rh, Cd, In, B, Si, P, F, Cl, Br, I, S, As, Re, Hg, Tl, Pb, or a combination thereof, and optionally C, N, or a combination thereof, M3 is an element of Ti, Nb, Sb, Bi, Ta, Mo, Ru, Pd, Ag, Sn, Se, Te, W, Os, Ir, Pt, Au, or a combination thereof, and X is O, N, P, or a combination thereof.

* * * * *